(12) United States Patent
Palanciuc et al.

(10) Patent No.: US 11,429,653 B2
(45) Date of Patent: Aug. 30, 2022

(54) GENERATING ESTIMATED TRAIT-INTERSECTION COUNTS UTILIZING SEMANTIC-TRAIT EMBEDDINGS AND MACHINE LEARNING

(71) Applicant: Adobe Inc., San Jose, CA (US)

(72) Inventors: Virgil-Artimon Palanciuc, Bucharest (RO); Alexandru Ionut Hodorogea, Bucharest (RO)

(73) Assignee: Adobe Inc., San Jose, CA (US)

( * ) Notice: Subject to any disclaimer, the term of this patent is extended or adjusted under 35 U.S.C. 154(b) by 912 days.

(21) Appl. No.: 16/229,672

(22) Filed: Dec. 21, 2018

(65) Prior Publication Data
US 2020/0201897 A1    Jun. 25, 2020

(51) Int. Cl.
| | |
|---|---|
| *G06F 15/16* | (2006.01) |
| *G06F 16/35* | (2019.01) |
| *G06K 9/62* | (2022.01) |
| *G06N 20/00* | (2019.01) |
| *G06F 40/30* | (2020.01) |

(52) U.S. Cl.
CPC ............ *G06F 16/353* (2019.01); *G06F 40/30* (2020.01); *G06K 9/6257* (2013.01); *G06N 20/00* (2019.01)

(58) Field of Classification Search
CPC ....... G06F 16/353; G06F 40/30; G06N 20/00; G06K 9/6257
USPC ........................................................ 709/200
See application file for complete search history.

(56) References Cited

U.S. PATENT DOCUMENTS

| | | | |
|---|---|---|---|
| 6,539,494 B1* | 3/2003 | Abramson | G06F 11/203 |
| | | | 714/E11.094 |
| 9,741,259 B2* | 8/2017 | Mahmud | G09B 7/00 |
| 10,268,988 B2* | 4/2019 | Lim | G06Q 10/1095 |
| 2014/0189022 A1* | 7/2014 | Strumwasser | H04L 67/22 |
| | | | 709/224 |
| 2015/0149153 A1* | 5/2015 | Werth | G06F 40/30 |
| | | | 704/9 |
| 2015/0170105 A1* | 6/2015 | Lim | G06Q 10/109 |
| | | | 705/7.19 |

OTHER PUBLICATIONS

T. Mikolov, K. Chen, G. Corrado, and J. Dean. 2013. Efficient estimation of word representations in vector space. arXiv preprint arXiv:1301.3781 (2013).

* cited by examiner

*Primary Examiner* — Moustafa M Meky
(74) *Attorney, Agent, or Firm* — Keller Preece PLLC

(57) ABSTRACT

This disclosure relates to methods, non-transitory computer readable media, and systems that, upon request for a trait-intersection count of users (or other digital entities) corresponding to traits for a target time period, use a machine-learning model to analyze a semantic-trait embedding of the traits and to generate an estimated trait-intersection count of such entities sharing the traits for the target time period. By applying a machine-learning model trained to estimate trait-intersection counts, the disclosed methods, non-transitory computer readable media, and systems can analyze both a semantic-trait embedding of traits and an initial trait-intersection count of trait-sharing entities for an initial time period to estimate the trait-intersection count for the target time period. The disclosed machine-learning model can thus analyze both the semantic-trait embedding and the initial trait-intersection count to efficiently and accurately estimate a trait-intersection count corresponding to a requested time period.

20 Claims, 12 Drawing Sheets

|  | XGBOOST | Neural Network |
|---|---|---|
| MSE | 0.006 | 0.023 |
| MAPE | 5.8% | 10% |

*Fig. 7A*

| Absolute Percentage Error Intersection Value | Absolute Error Overlap (I/C1) |
|---|---|
| Mean | 5.8% | 0.3 |
| Median | 4.2% | 0.07 |
| Percentile 90 | 12.4% | 0.8 |

*Fig. 7B*

|  | XGBOOST | Neural Network |
|---|---|---|
| MSE | 0.046 | 0.05 |
| MAPE | 10% | 10.5% |

GENERATING ESTIMATED TRAIT-INTERSECTION COUNTS UTILIZING SEMANTIC-TRAIT EMBEDDINGS AND MACHINE LEARNING

BACKGROUND

Developers have made significant improvements in data-management systems that analyze client-device interactions to analyze and track various digital assets and client characteristics. To illustrate, some data-management systems can access databases to count a number of client devices, client-device users, or digital interactions one-by-one that share a particular feature or characteristic. For example, a conventional data-management system may process profiles from a profile database to count client-device users from a particular geographic region that have downloaded a particular software application. By counting client-device users with overlapping characteristics from a database, a data-management system can provide reports or graphical representations in relation to client-device users with common characteristics. But current data-management systems have computing limitations that overly task computing resources, inaccurately tally characteristic overlaps, and constrain the application of character-overlap counting.

For example, some conventional data-management systems inefficiently consume processor and other computing resources when computing digital-intersection counts from a relatively large data repository. By analyzing and counting intersections of features or characteristics one by one from a database, conventional data-management systems often process a considerable amount of digital data. Such computations can become inefficient and computationally taxing when digital accounts or profiles tally in the thousands, tens of thousands, millions, or billions. Because of such inefficient computing, a conventional data-management system sometimes expends considerable time to compute a count of client-device users sharing characteristics and significantly delay generating digital reports or graphics.

In addition to inefficient computing, in some cases, conventional data-management systems inaccurately compute digital-intersection counts from data repositories. For instance, some conventional data-management systems fail to detect errors in databases that introduce misidentified client-device users into a shared-characteristic-user count. Further, to preserve computing resources, conventional data-management systems sometimes rely on a sample of client-device users in a database to extrapolate a number of all users sharing characteristics. But such extrapolation can lead to significant counting errors, particularly when the sample of users is relatively small or not representative of a larger group of users.

Independent of computing inefficiencies and inaccuracies, conventional data-management systems often limit the application of digital-intersection counts. In some cases, for instance, conventional data-management systems count a number of users sharing characteristics exclusively to report this raw number. Such platforms do not or cannot extend or apply the count of users sharing characteristics to other metrics.

SUMMARY

This disclosure describes one or more embodiments of methods, non-transitory computer readable media, and systems that solve the foregoing problems in addition to providing other benefits by efficiently and precisely approximating cardinality of set intersections utilizing a machine-learning model. For example, upon request for a trait-intersection count of users (or other digital entities) corresponding to traits for a target time period, the disclosed systems can use a machine-learning model to analyze a semantic-trait embedding of the traits and to generate an estimated trait-intersection count of such digital entities sharing the traits for the target time period. By applying a machine-learning model trained to estimate trait-intersection counts, the disclosed systems can analyze both a semantic-trait embedding of traits and an initial trait-intersection count of trait-sharing entities for an initial time period to estimate the trait-intersection count for the target time period. The disclosed machine-learning model can thus analyze both the semantic-trait embedding and the initial trait-intersection count to efficiently and accurately estimate a trait-intersection count corresponding to a requested time period.

For instance, in some embodiments, the disclosed systems identify a request for a trait-intersection count of users (or other digital entities) corresponding to traits for a target time period. The systems further identify a semantic-trait embedding of the traits. In addition to generating the embedding, the systems also determine an initial trait-intersection count of digital entities corresponding to the traits for an initial time period. Based on the request, the systems generate an estimated trait-intersection count of digital entities corresponding to the traits for the target time period by analyzing the semantic-trait embedding and the initial trait-intersection count using a machine-learning model trained to generate estimated trait-intersection counts.

BRIEF DESCRIPTION OF THE DRAWINGS

The detailed description refers to the drawings briefly described below.

FIGS. 7A-7C illustrate tables representing error rates across tests of different machine-learning models imple

DETAILED DESCRIPTION

Figure 1:
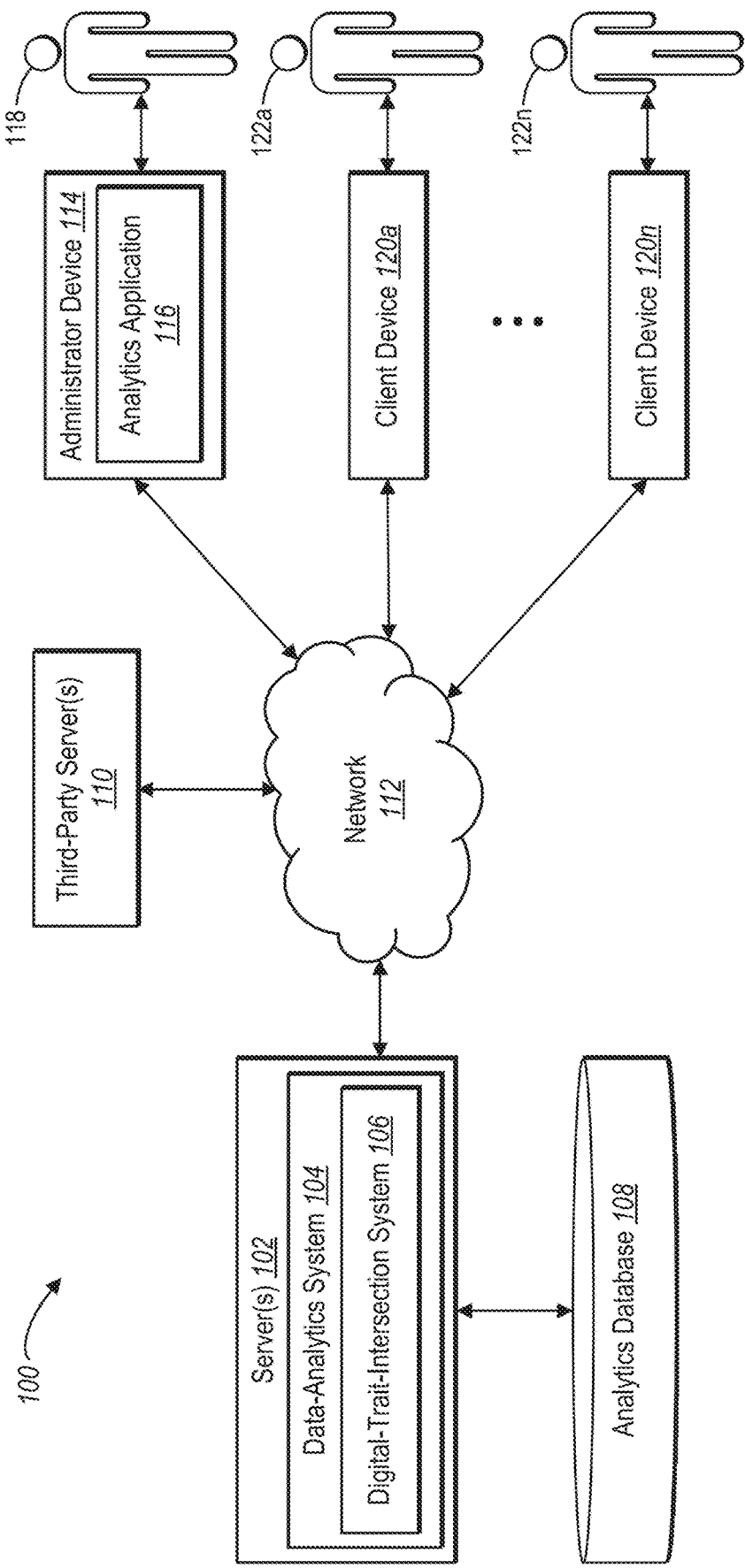
FIG. 1 illustrates a block diagram of an environment in which a data-analytics system and a digital-trait-intersection system can operate in accordance with one or more embodiments.

One or more embodiments described herein include a digital-trait-intersection system that uses a machine-learning model to estimate a trait-intersection count of digital entities corresponding to traits for a target time period based on a semantic-trait embedding. In particular, the digital-trait-intersection system can eschew conventional counting by embedding traits in a smaller, dense set, then using these embeddings and engineered features to train a complex machine-learning model for cardinality estimation. For example, in response to a request for a trait-intersection count of users (or other digital entities) for a target time period, the digital-trait-intersection system can apply a machine-learning model to analyze both a semantic-trait embedding of the traits and an initial trait-intersection count of digital entities corresponding to such traits for an initial time period. By analyzing features from both the semantic-trait embedding and the initial trait-intersection count, the digital-trait-intersection system can preserve computing resources and improve the accuracy of estimating a trait-intersection count for traits across digital entities corresponding to a requested time period.

For instance, in some embodiments, the digital-trait-intersection system identifies a request for a trait-intersection count of digital entities corresponding to a first trait and a second trait for a target time period. The digital-trait-intersection system further identifies a semantic-trait embedding of the first trait and the second trait (e.g., by identifying a previously generated semantic-trait embedding or generating a semantic-trait embedding). As a reference for the requested trait-intersection count, the digital-trait-intersection system further determines an initial trait-intersection count of digital entities corresponding to the first trait and the second trait for an initial time period. Based on the request, the digital-trait-intersection system generates an estimated trait-intersection count of digital entities corresponding to the first trait and the second trait for the target time period by analyzing the semantic-trait embedding and the initial trait-intersection count using a machine-learning model trained to generate estimated trait-intersection counts. In some such implementations, for instance, the digital-trait-intersection system applies a decision-tree regressor or an artificial neural network as the machine-learning model.

When identifying or receiving a trait-intersection-count request, the digital-trait-intersection system may identify a request for a trait-intersection count of a variety of digital entities, such as trait-intersection counts of users, events, products, or transactions. In some cases, the request seeks for one or more segments of users corresponding to a particular trait or to multiple traits. Based on receiving a request for a trait-intersection count for a target time period from a client device, the digital-trait-intersection system can generate an estimated trait-intersection count of the requested digital entities for the target time period for display within a graphical user interface.

As suggested above, the digital-trait-intersection system can generate, identify, and/or analyze a semantic-trait embedding for the requested traits. For instance, in some implementations, the digital-trait-intersection system uses a semantic-word-vector model to generate a semantic-embedding vector for one trait and another semantic-embedding vector for another trait (e.g., where a request identifies both traits). When analyzing semantic-embedding vectors, the digital-trait-intersection system can further use a machine-learning model to modify the semantic-embedding vectors as a basis for estimating a trait-intersection count for traits based on the semantics of the traits.

As noted above, in some embodiments, the digital-trait-intersection system further determines (and analyzes) an initial trait-intersection count of digital entities corresponding to traits for an initial time period. For instance, the digital-trait-intersection system can use network layers of the machine-learning model to generate a trait-intersection-count vector for an initial trait-intersection count. The digital-trait-intersection system can further use the machine-learning model to analyze the trait-intersection-count vector to estimate a trait-intersection count for a target time period.

In addition to analyzing a semantic-trait embedding and an initial trait-intersection count, in some cases, the digital-trait-intersection system uses a machine-learning model to analyze a time-segment indicator corresponding to the initial time period for the initial trait-intersection count. Such a time-segment indicator may be, for instance, one or both of a day of a month and a year for the initial trait-intersection count. Independent of a time-segment indicator's form, the digital-trait-intersection system can generate an estimated trait-intersection count for a target time period based in part on using the machine-learning model to analyze the time-segment indicator.

In addition (or in the alternative) to applying a machine-learning model, in some embodiments, the digital-trait-intersection system trains a machine-learning model to generate estimated trait-intersection-training counts. For instance, in certain implementations, the digital-trait-intersection system applies a semantic-word-vector model to a first training trait and a second training trait to generate a semantic-trait-training embedding. The digital-trait-intersection system further identifies an initial trait-intersection-training count of digital entities corresponding to the first training trait and the second training trait for an initial-training-time period. The digital-trait-intersection system subsequently applies a machine-learning model to the semantic-trait-training embedding and the initial trait-intersection-training count to generate an estimated trait-intersection-training count of digital entities corresponding to the first training trait and the second training trait for a target-training-time period. Based on a comparison of the estimated trait-intersection-training count with a ground-truth-trait-intersection count of digital entities corresponding to the first training trait and the second training trait for the target-training-time period, the digital-trait-intersection system modifies parameters of the machine-learning model.

As suggested above, the digital-trait-intersection system improves and overcomes several technical deficiencies that hinder conventional data-management systems. First, the digital-trait-intersection system improves the computing efficiency with which a data-management system generates a trait-intersection count. Unlike the one-by-one counting of conventional data-management systems, the digital-trait-intersection system uses a machine-learning system to estimate a trait-intersection count for traits based on one or both of a semantic-trait embedding of the traits and an initial trait-intersection count for an initial time period. By using the machine-learning model to estimate trait-intersection counts, the digital-trait-intersection system uses less computer processing than conventional systems to generate such counts, particularly when processing multiple trait-intersection-count requests or counting users or other digital entities from a database within entities tallying in the thousands, tens of thousands, millions, or billions. Such efficient estimated counts further expedite the digital-trait-intersection system in generating a report or visual graphic depicting trait-intersection counts or corresponding metrics.

Second, the digital-trait-intersection system improves the efficiency with which a data-management system generates a trait-intersection count. Unlike conventional systems that rely on unrepresentative samples of digital entities or error-prone methods or tracking digital entries, the digital-trait-intersection system uses a machine-learning model that can use both a semantic-trait embedding (that captures contextual information regarding trait characteristics) and an initial trait-intersection count for an initial time period to accurately generate an estimated trait-intersection count for a target time period. By cycling through training iterations to improve accuracy, in some embodiments, the digital-trait-intersection system can use both semantic-trait embeddings and an initial trait-intersection count as a reference to accurately estimate a trait-intersection count for a target time period.

Third, the digital-trait-intersection system expands the utility of estimated trait-intersection counts to applications beyond those utilized by conventional data-management systems. In addition to estimating trait-intersection counts of users, the digital-trait-intersection system can apply such counts to generate or visualize a segment of users corresponding to a particular trait (or to multiple traits) in response to a segment-trait request—thereby providing an accurate estimate of a segment size or overlap between multiple segments in real time. Further, in some embodiments, the digital-trait-intersection system can flexibly estimate trait-intersection counts of not only users, but also events, products, or transactions. Additionally, in certain implementations, the digital-trait-intersection system uses an estimated trait-intersection count to identify anomalies in observed trait-intersection counts tallied digital entity by digital entity.

As indicated by the foregoing description, this disclosure uses a variety of terms to describe features and advantages of the digital-trait-intersection system. As used in this disclosure, the term "trait" refers to a digital action, characteristic, classification, or quality of a digital entity. In some embodiments, for instance, a trait refers to an action performed by a user or client device via a network, a characteristic of a user or other digital entity, or a classification of a user or other digital entity identified or recorded in a database. A trait may be, but is not limited to, an age or age range, an amount of currency, a downloaded application or product, a gender, a geographic location for a user or client device, a language of a user, a subscription to a digital service, or a webpage or website visited by a user. Relatedly, the term "digital entity" refers to an instance of digital data stored by or represented in a database. For instance, a digital entity may refer to an event, image, file, product, service, user, or transaction stored by or represented by data in a database.

As noted above, the digital-trait-intersection system estimates trait-intersection counts. The term "trait-intersection count" refers to a count of digital entities that correspond to (or that share) one or more traits at, during, or over a given time period. In some embodiments, a trait-intersection count refers to a count of users or user accounts corresponding to (or who share) multiple identified traits at, during, or over an initial or target time period. For example, a trait-intersection count may include a count of client device users who, according to a profile database, live in a geographic region and who downloaded or subscribe to a particular software application. As a further example, a trait-intersection count may include a count of digital bids that, according to a database, offer an amount of currency over a particular threshold and bid on a particular campaign or project from a digital posting.

As mentioned above, the digital-trait-intersection system can estimate trait-intersection counts based on semantic-trait embeddings. The term "semantic-trait embedding" refers to a linguistic embedding for a word, phrase, term, or combination thereof that identifies or describes a trait or multiple traits. In some embodiments, a semantic-trait embedding refers to an embedding of a word or term describing a trait in a semantic space (e.g., a multi-dimensional space where position within the space corresponds to semantic meaning). For example, in some cases, the digital-trait-intersection system applies a semantic-word-vector model to generate a semantic-trait embedding for a trait in a semantic space, such as by applying a Word2Vec model to a label or word indicator for a trait.

Relatedly, the term "segment" refers to a group of users, user accounts, or data corresponding to a particular trait. In particular, a segment can include one or more subsets of users who share at least one common trait. Further, a segment can include one or more subsets of data representing touchpoints having instances of touchpoint data that share at least one common trait—including, but not limited to, touchpoints such as receiving an email, viewing a digital advertisement, visiting a webpage or social network page, or viewing a link to a webpage or social network page. For example, a segment can include one or more subsets of touchpoint data associated with users of a particular user type (e.g., age range, geographic location, gender, interests), one or more subsets of touchpoint data associated with use of a particular device type (e.g., mobile users, tablet users, desktop users), or one or more subsets of touchpoint data associated with a particular product (e.g., product category, product ID, or product name). Accordingly, a segment can comprise a subset of visitors, visits, or hits based on traits.

As used in this disclosure, the term "machine-learning model" refers to a model trained to approximate unknown functions or a to classify features based on training input. In some embodiments, a machine-learning model can include an artificial-neural-network model of interconnected artificial neurons that communicate and learn to approximate complex functions and generate outputs based on inputs provided to the model, such as a convolutional neural network ("CNN") or a recurrent neural network ("RNN"). In certain implementations, a machine-learning model can include a decision-tree-learning model that maps features of a semantic-trait embedding (or a trait-intersection vector) to one or more values. In some such cases, the machine-learning model constitutes a decision-tree regressor, such as XGBoost.

Turning now to FIG. 1, this figure depicts a block diagram illustrating an exemplary system environment ("environment") 100 in which a digital-trait-intersection system 106 can operate in accordance with one or more embodiments. Specifically, FIG. 1 illustrates the environment 100 comprising server(s) 102, third-party server(s) 110, a network 112, an administrator device 114, an administrator 118 associated with the administrator device 114, client devices 120a-120n, and users 122a-122n associated with the client devices 120a-122n. Although FIG. 1 illustrates one administrator device and one administrator—and two client devices and two users—the environment 100 can alternatively include any number of computing devices and associated administrators or users. Similarly, although FIG. 1 illustrates a particular arrangement of the server(s) 102, the third-party server(s) 110, the network 112, the administrator device 114, and the client devices 120a-120n, various additional arrangements are possible.

As shown in FIG. 1, the server(s) 102, the third-party server(s) 110, the network 112, the administrator device 114, and the client devices 120a-120n may be communicatively coupled with each other either directly or indirectly, such as coupling through the network 112, which is described further below in relation to FIG. 8. The server(s) 102, the administrator device 114, and the client devices 120a-120n may include any type of computing device, including one or more computing devices as discussed further below in relation to FIG. 8.

As depicted in FIG. 1, the server(s) 102 can generate, store, receive, and/or transmit any type of data, including requests for trait-intersection counts or datasets underlying reports or visualizations of trait-intersection counts. For example, the server(s) 102 can receive a request for a trait-intersection count of digital entities corresponding to traits for a target time period from the administrator device 114. The server(s) 102 can further transmit data packets that, upon receipt, cause the administrator device 114 to present a report or visualization of an estimated trait-intersection count within a graphical user interface. In some embodiments, the server(s) 102 comprise a data server, a communication server, or a web-hosting server.

As further shown in FIG. 1, the server(s) 102 can include a data-analytics system 104. The data-analytics system 104 can perform various digital-analytics functions or digital-campaign functions. For example, in some embodiments, the data-analytics system 104 uses the server(s) 102 to collect data corresponding to events and touchpoints from the client devices 120a-120n (e.g., by collecting data tracking application uses, orders, purchases, or webpage views). The data-analytics system 104 may collect such datasets to determine or identify traits of the users 122a-122n. Relatedly, in some cases, the third-party server(s) or the data-analytics system 104 via the server(s) 102 track actions performed; files accessed, downloaded, or purchased; products or services downloaded or used; or transactions made by the client devices 120a-120n in connection with the server(s) 102 or the third-party server(s) 110.

In addition to the data-analytics system 104, the server(s) 102 can include the digital-trait-intersection system 106. The digital-trait-intersection system 106 (or the data-analytics system 104) can use the server(s) 102 to request from the third-party server(s) 110 (or retrieve from an analytics database 108) datasets corresponding to user profiles to store in the analytics database 108, such as datasets representing actions, files, products or services, or transactions related to particular users. The digital-trait-intersection system 106 can further use the server(s) 102 to generate semantic-trait embeddings for traits identified from user profiles or determine initial trait-intersection counts of digital entities corresponding to traits (e.g., a pair of traits). Based on a trait-intersection-count request, the digital-trait-intersection system 106 further generates estimated trait-intersection counts of digital entities corresponding to particular traits for a target time period by analyzing semantic-trait embeddings and the initial trait-intersection counts using a machine-learning model trained to generate estimated trait-intersection counts.

As illustrated by the previous embodiments, the digital-trait-intersection system 106 can be implemented in whole or in part by the individual elements of the environment 100. Although FIG. 1 illustrates the digital-trait-intersection system 106 implemented within the server(s) 102, components of the digital-trait-intersection system 106 can be implemented in any of the components of the environment 100. For instance, in some embodiments, the administrator device 114 comprises the digital-trait-intersection system 106 and performs all of the functions, methods, and processes of the digital-trait-intersection system 106 described above and below. This disclosure describes the components of the digital-trait-intersection system 106 further below with regard to FIG. 8.

As further shown in FIG. 1, in some embodiments, the administrator device 114 comprises a computing device that enables the administrator 118 to send and receive digital communications. For example, the administrator device 114 can include a desktop computer, laptop computer, smartphone, tablet, or other electronic device. In some embodiments, the administrator device 114 further includes one or more software applications (e.g., an analytics application 116) that enables the administrator 118 to send and receive digital communications. For example, the analytics application 116 can be a software application installed on the administrator device 114 or a software application hosted on the server(s) 102. When hosted on the server(s) 102, the analytics application 116 may be accessed by the administrator device 114 through another application, such as a web browser. In some implementations, the analytics application 116 includes instructions that, when executed by a processor, cause the administrator device 114 to present one or more graphical user interfaces, such as various user interfaces comprising representations of trait-intersection counts described below.

As also illustrated in FIG. 1, the data-analytics system 104 is communicatively coupled to the analytics database 108. Among other things, the analytics database 108 includes a record of digital user profiles and traits corresponding to individual user profiles and/or a record of other digital entities (e.g., events, products, or transactions) and traits corresponding to individual digital entities. In one or more embodiments, the data-analytics system 104 accesses and queries data from the analytics database 108 associated with requests from the digital-trait-intersection system 106. For instance, the data-analytics system 104 may access datasets corresponding to traits, user profiles, or other digital entities for the digital-trait-intersection system 106. As shown in FIG. 1, the analytics database 108 is separately maintained from the server(s) 102. Alternatively, in one or more embodiments, the data-analytics system 104 and the analytics database 108 comprise a single combined system or subsystem within the server(s) 102.

Figure 2:
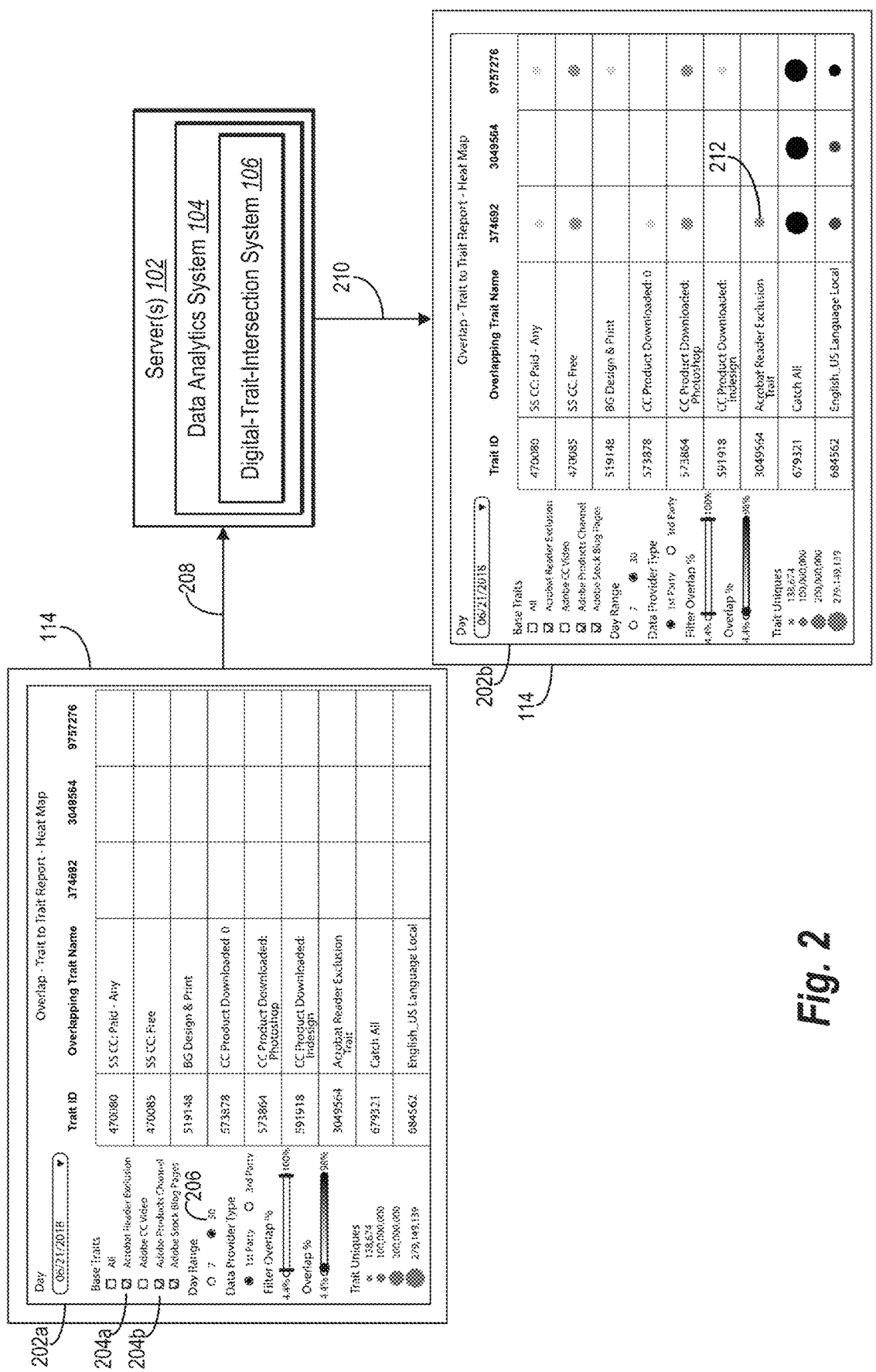
FIG. 2 illustrates the digital-trait-intersection system using a machine-learning model to estimate a trait-intersection count for a target time period in response to a trait-intersection-count request in accordance with one or more embodiments.

FIG. 2 illustrates the digital-trait-intersection system 106 using a machine-learning model to estimate a trait-intersection count of users for a target time period in accordance with one or more embodiments. As shown in FIG. 2, the digital-trait-intersection system 106 receives a request 208 from the administrator device 114 for a trait-intersection count of users corresponding to traits for a target time period. Based on the request 208, the digital-trait-intersection system 106 applies a machine-learning model to analyze both a semantic-trait embedding of the traits and an initial trait-intersection count of users corresponding to such traits for an initial time period. By applying a machine-learning model, the digital-trait-intersection system 106 generates an estimated count of the users corresponding to the traits for the target time period and sends the estimated count to the administrator device 114.

In particular, the administrator device 114 sends the request 208 to the server(s) 102 for a trait-intersection count of users corresponding to traits for a target time period. As shown in FIG. 2, the digital-trait-intersection system 106 provides the administrator device 114 with selectable options for trait-intersection-count requests within a graphical user interface 202a (e.g., by sending data to the administrator device 114 representing such options). Through the graphical user interface 202a, the administrator device 114 detects selections by the administrator 118 of selectable options corresponding to traits 204a and 204b and a target time period 206. Accordingly, the request 208 seeks a trait-intersection count of users corresponding to the traits 204a and 204b for the target time period 206. In some embodiments, the request 208 indicates that one or both of the traits 204a and 204b correspond to a segment of users in a segment-trait request.

Based on the request 208, the digital-trait-intersection system 106 generates an estimated count of users corresponding to the traits 204a and 204b for the target time period 206. Before or after receiving the request 208, the digital-trait-intersection system 106 generates a semantic-trait embedding for the traits 204a and 204b, such as a semantic-embedding vector for each of the traits 204a and 204b. The digital-trait-intersection system 106 further determines an initial trait-intersection count of users corresponding to the traits 204a and 204b for an initial time period (e.g., seven days). Upon receiving the request 208, the digital-trait-intersect system 106 inputs or provides the semantic-trait embedding for the traits 204a and 204b and the initial trait-intersection count to a machine-learning model. By analyzing features of both inputs, the machine-learning model generates an estimated count of users corresponding to the traits 204a and 204b for the target time period 206.

As further depicted by FIG. 2, the digital-trait-intersection system 106 sends data 210 to the administrator device 114 indicating the estimated count. Upon receipt of the data 210, the administrator device 114 presents an estimated-count indicator 212 within a graphical user interface 202b. As shown within the graphical user interface 202b, the estimated-count indicator 212 indicates an estimated number of users who share the traits 204a and 204b for the target time period 206.

In addition to the estimated-count indicator 212, the graphical user interface 202b includes additional estimated-count indicators corresponding to different estimated counts of users corresponding to different traits for the target time period 206. As the additional estimated-count indicators suggest, in some embodiments, the digital-trait-intersection system 106 uses a machine-learning model to estimate multiple trait-intersection counts for a target time period in response to multiple trait-intersection-count requests. The improved computer-processing of the digital-trait-intersection system 106 enables such multiple and extemporaneous estimated counts. While the estimated-count indicator 212 indicates the estimated number with a size of dot, the digital-trait-intersection system 106 can generate estimated-count indicators using other graphical representations, such as tables, histograms, or Venn diagrams.

Figure 3:
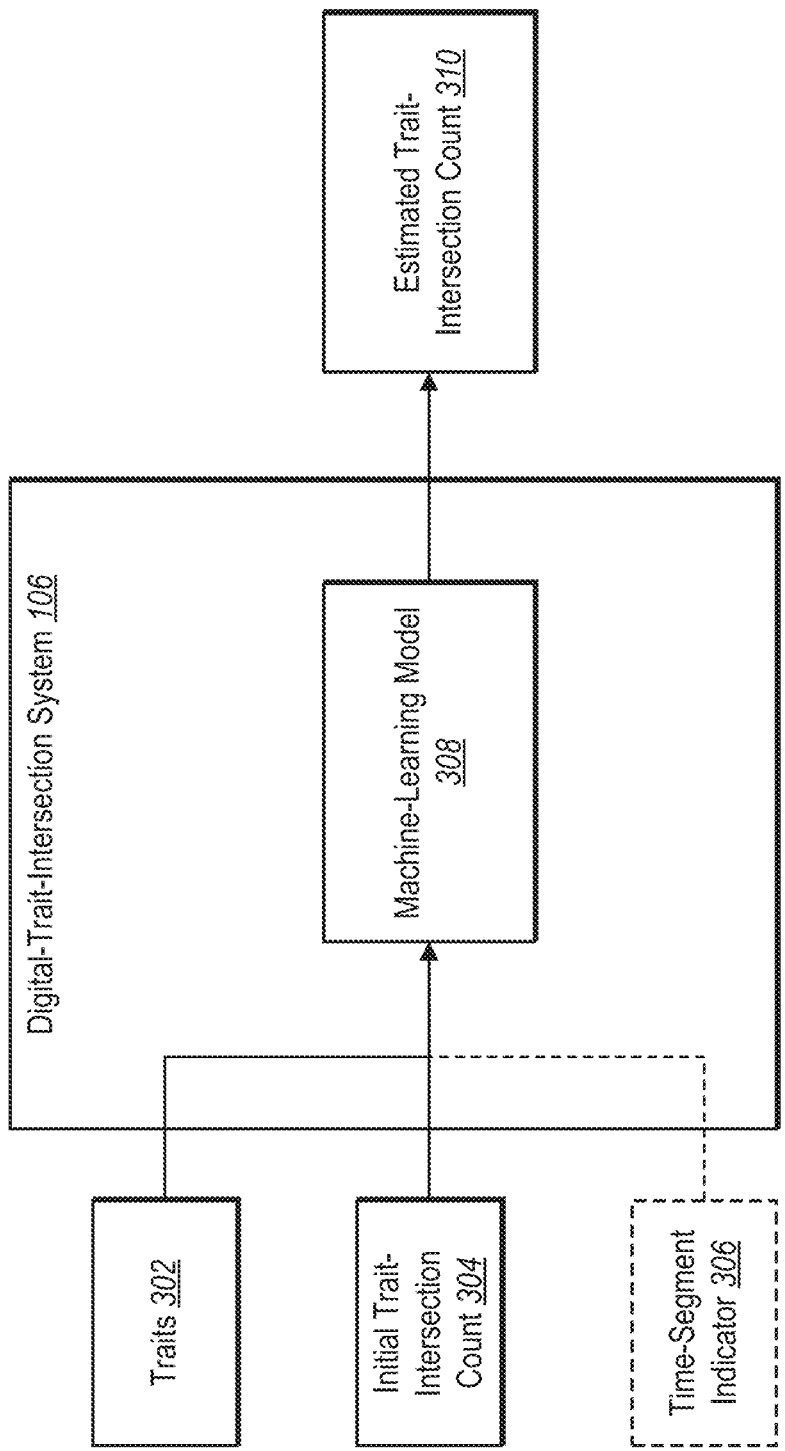
FIG. 3 illustrates the digital-trait-intersection system using a machine-learning model to estimate a trait-intersection count for a target time period based on traits and an initial trait-intersection count for an initial time period in accordance with one or more embodiments.

FIG. 3 provides an example of the digital-trait-intersection system 106 using a machine-learning model. In accordance with one or more embodiments, FIG. 3 depicts the digital-trait-intersection system 106 using a machine-learning model 308 to generate an estimated trait-intersection count 310 for a target time period in response to a trait-intersection-count request. Based on a request for a trait-intersection count of digital entities corresponding to traits 302 for a target time period, the digital-trait-intersection system 106 provides the traits 302, an initial trait-intersection count 304 for an initial time period, and (optionally) a time-segment indicator 306 corresponding to the initial time period to the machine-learning model 308. By applying the machine-learning model 308 to such inputs, the digital-trait-intersection system 106 generates the estimated trait-intersection count 310 of digital entities corresponding to the traits 302 for the target time period.

As just indicated for FIG. 3, the digital-trait-intersection system 106 provides the traits 302 and the initial trait-intersection count 304 to the machine-learning model 308. In some embodiments, the digital-trait-intersection system 106 applies a semantic-word-vector model to the traits 302 to generate a semantic-trait embedding for the traits 302 and subsequently inputs the semantic-trait embedding into the machine-learning model 308. In certain implementations, the digital-trait-intersection system 106 further inputs the initial trait-intersection count 304 into the machine-learning model 308 to generate a trait-intersection-count vector for the initial trait-intersection count 304.

In addition to the traits 302 and the initial trait-intersection count 304, in some embodiments, the digital-trait-intersection system 106 provides the time-segment indicator 306 to the machine-learning model 308. As used in this disclosure, the term "time-segment indicator" refers to a dimension for a time period, such as a day, week, month, or year. In some cases, for example, a time-segment indicator includes one or both of a day of a month and a year for an initial time period. Additionally, or alternatively, a time-segment indicator may include a day of a week or a month corresponding to an initial time period. In certain implementations, the digital-trait-intersection system 106 applies a vector generator to the time-segment indicator 306 to generate a time-segment vector and subsequently inputs the time-segment vector into the machine-learning model 308.

After the digital-trait-intersection system 106 inputs representations of the traits 302, the initial trait-intersection count 304, and (optionally) the time-segment indicator 306, the machine-learning model 308 analyzes features of each input. As suggested above, for instance, the machine-learning model 308 generates a trait-intersection-count vector for the initial trait-intersection count 304 and modified versions of the semantic-trait embedding and the time-segment vector. Based on the semantic-trait embedding, the initial trait-intersection-count 304, and the time-segment vector, or modifications thereof, the machine-learning model 308 generates the estimated trait-intersection count 310 of digital entities corresponding to the traits 302 for the target time period.

Figure 4A:
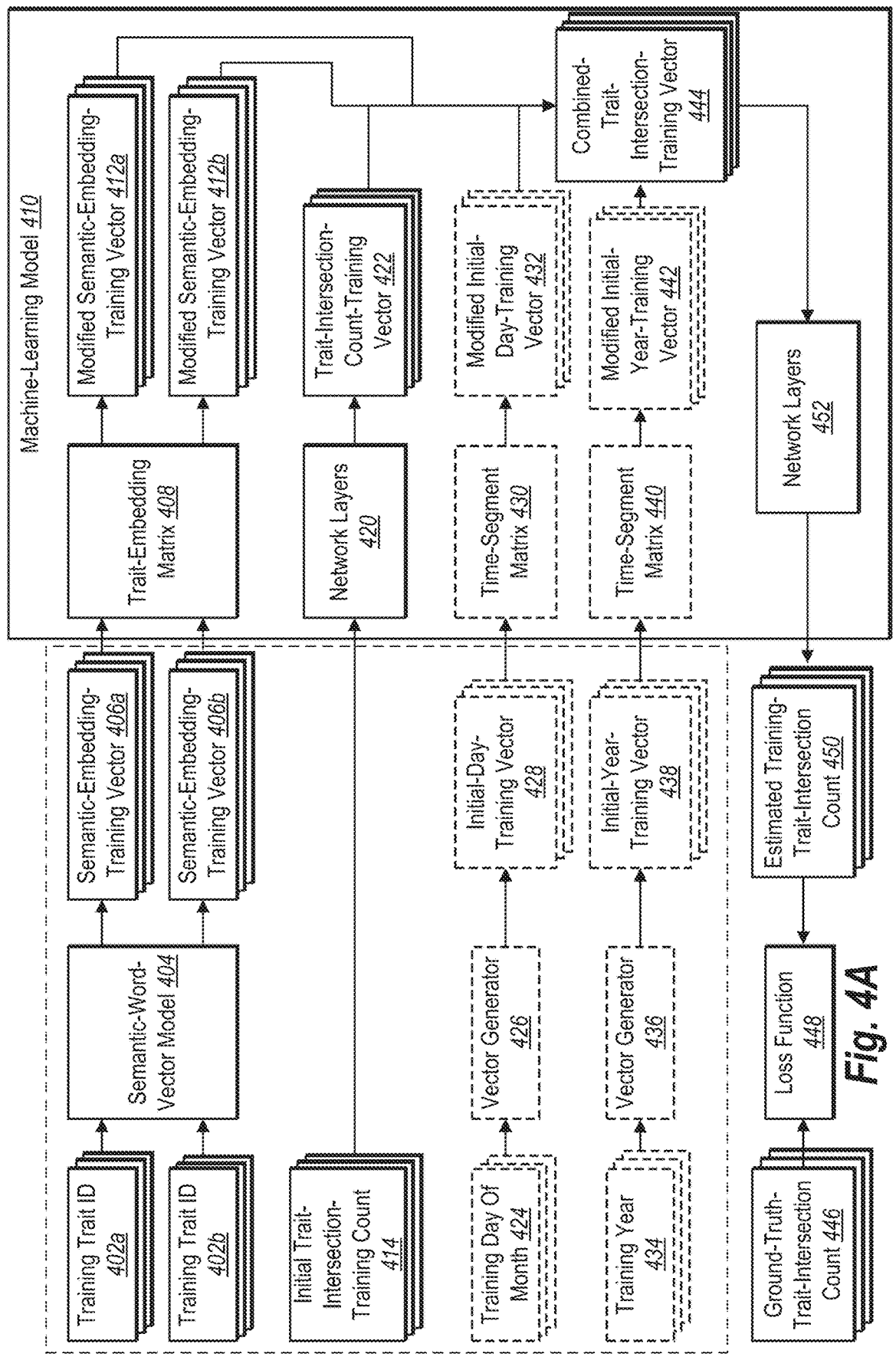
FIG. 4A illustrates the digital-trait-intersection system training a machine-learning model to generate estimated trait-intersection-training counts in accordance with one or more embodiments.

As noted above, in some embodiments, the digital-trait-intersection system 106 trains a machine-learning model to generate estimated trait-intersection counts. FIG. 4A depicts an example of such training. As shown in FIG. 4A, the digital-trait-intersection system 106 iteratively applies a semantic-word-vector model 404 to training trait indicators to generate semantic-embedding-training vectors. In each training iteration, the digital-trait-intersection system 106 further inputs into the machine-learning model 410 an initial trait-intersection-training count corresponding to the training trait indicators for an initial-training-time period. The digital-trait-intersection system 106 subsequently applies the machine-learning model 410 to the semantic-embedding-training vectors and the initial trait-intersection-training count to generate an estimated trait-intersection-training count for a target-training-time period. Based on a comparison of the estimated trait-intersection-training count with a ground-truth-trait-intersection count for the target-training-time period, the digital-trait-intersection system 106 modifies parameters of the machine-learning model 410 for a given training iteration.

In an initial training iteration, for example, the digital-trait-intersection system 106 applies the semantic-word-vector model 404 to training trait indicators 402a and 402b. In some cases, such training trait indicators each represent a term, phrase, number, alphanumeric, or other identifier of traits used in training a machine-learning model. When applying the semantic-word-vector model 404 to the training trait indicators 402a and 402b, for instance, the digital-trait-intersection system 106 can apply a Word2Vec model, a Global Vectors ("GloVe") model, a FastText model, or another semantic-word-vector model. Upon application, the semantic-word-vector model 404 outputs the semantic-embedding-training vectors 406a and 406b, which respectively correspond to the training trait indicators 402a and 402b. Accordingly, the semantic-embedding-training vectors 406a and 406b are vectoral representations of the training trait indicators 402a and 402b.

As further shown in FIG. 4A, the digital-trait-intersection system 106 inputs the semantic-embedding-training vectors 406a and 406b into the machine-learning model 410. Consistent with the disclosure above, the machine-learning model 410 may comprise an artificial neural network or a regressor, such as a decision-tree regressor. Accordingly, while FIG. 4A depicts various matrices and network layers, in some embodiments, the machine-learning model 410 additionally or alternatively includes decision nodes for a decision-tree regressor.

As part of applying the machine-learning model 410, in some embodiments, the digital-trait-intersection system 106 applies a trait-embedding matrix 408 of the machine-learning model 410 to the semantic-embedding-training vectors 406a and 406b. The trait-embedding matrix 408 comprises a layer that applies parameters or weights to semantic-embedding vectors. For example, in some embodiments, the trait-embedding matrix 408 constitutes a weight matrix that applies certain (and adjustable) weights to semantic-embedding vectors. Upon application, the trait-embedding matrix 408 generates modified semantic-embedding-training vectors 412a and 412b, which respectively correspond to the semantic-embedding-training vectors 406a and 406b. As explained further below, in certain implementations, the machine-learning model 410 combines the modified semantic-embedding-training vectors 412a and 412b with one or more other modified-training vectors to generate a combined-trait-intersection-training vector 444.

In addition to analyzing the training trait indicators 402a and 402b, the digital-trait-intersection system 106 analyzes an initial trait-intersection-training count 414 of digital entities corresponding to the training trait indicators 402a and 402b for an initial-training-time period. In particular, the digital-trait-intersection system 106 inputs the initial trait-intersection count 414 into the machine-learning model 410. In some embodiments, for instance, the digital-trait-intersection system 106 provides the initial trait-intersection count 414 to network layers 420 of the machine-learning model 410. The network layers 420 can constitute layers of a neural network, such as fully connected layers.

After inputting the trait-intersection count 414, the network layers 420 output a trait-intersection-count-training vector 422. The trait-intersection-count-training vector 422 represents features of the initial trait-intersection count 414 (e.g., a latent-feature vector reflecting the initial training-intersection-training count 414). As explained further below, in some embodiments, the machine-learning model 410 combines the trait-intersection-count-training vector 422 with one or more other modified-training vectors to generate the combined-trait-intersection-training vector 444.

As explained further below, in some embodiments, the digital-trait-intersection system 106 applies the network layers 420 to multiple different trait-intersection-training counts as part of training the machine-learning model 410. For example, the initial trait-intersection-training count 414 can include cardinality of the traits population set over the reference period and target period, the cardinality of the intersection of populations over the reference period, and/or additional statistics over the corresponding time series for each feature (such as rolling mean, max, median). Accordingly, the digital-trait-intersection system 106 can generate a trait-intersection-count-training vector for each trait-intersection-training count input into the machine-learning model 410 (or a trait-intersection-count-training vector for multiple trait-intersection-training counts input into the machine-learning model 410).

In addition to the training trait indicators 402a and 402b and the initial trait-intersection-training count 414, in some embodiments, the digital-trait-intersection system 106 further analyzes time-segment-training indicators corresponding to the initial-training-time period. FIG. 4A depicts a training day of month 424 and a training year 434 as examples of time-segment-training indicators. Both the training day of month 424 and the training year 434 correspond to the initial-training-time period for the initial trait-intersection-training count 414.

As shown in FIG. 4A, in certain implementations, the digital-trait-intersection system 106 applies a vector generator 426 to the training day of month 424 to generate an initial-day-training vector 428. Similarly, the digital-trait-intersection system 106 applies a vector generator 436 to the training year 434 to generate an initial-year-training vector 438. The digital-trait-intersection system 106 subsequently inputs the initial-day-training vector 428 and the initial-year-training vector 438 into the machine-learning model 410.

As used in this disclosure, the term "vector generator" refers to a vector-encoding model that generates a vector from a number, numeric features, series, or indicator thereof. For example, in some embodiments, a vector generator applies a vector-encoding method to an input number or numeric feature, such as by applying one-hot encoding or dummy encoding to a day of a month or a year represented in numeric format.

As part of applying the machine-learning model 410 shown in FIG. 4A, the digital-trait-intersection system optionally applies a time-segment matrix 430 and a time-segment matrix 440 respectively to the initial-day-training vector 428 and the initial-year-training vector 438. Similar to the trait-embedding matrix 408, the time-segment matrices 430 and 440 comprise layers that apply parameters or weights to time-segment-training vectors, such as weight matrices in a neural network. In some embodiments, the time-segment matrices 430 and 440 comprise embedding layers that output vectors from initial-day vectors or initial-year vectors. Upon application, the time-segment matrix 430 and the time-segment matrix 440 respectively generate a modified initial-day-training vector 432 and a modified initial-year-training vector 442.

In addition to generating the various modified-training vectors shown in FIG. 4A, the digital-trait-intersection system 106 uses the machine-learning model 410 to combine modified-training vectors to generate the combined-trait-intersection-training vector 444. For example, in some embodiments, the digital-trait-intersection system 106 combines or concatenates the modified semantic-embedding-training vectors 412a and 412b and the trait-intersection-count-training vector 422 together to generate the combined-trait-intersection-training vector 444. Additionally or alternatively, in certain implementations, the digital-trait-intersection system 106 further combines or concatenates the modified initial-day-training vector 432 and the modified initial-year-training vector 442 with the other modified-training vectors to generate the combined-trait-intersection-training vector 444.

As further depicted in FIG. 4A, the digital-trait-intersection system 106 uses the machine-learning model 410 to input the combined-trait-intersection-training vector 444 into network layers 452. In some embodiments, the network layers 452 constitute layers of a neural network, such as fully connected layers. After input of the combined-trait-intersection-training vector 444, the network layers 452 output the estimated training-trait-intersection count 450. As indicated above, the estimated training-trait-intersection count 450 represents a count of digital entities corresponding to the training trait indicators 402a and 402b for the target-training-time period.

After generating the estimated training-trait-intersection count 450, the digital-trait-intersection system 106 compares the estimated training-trait-intersection count 450 with the ground-truth-trait-intersection count 446. As used in this disclosure, the term "ground-truth-trait-intersection count" refers to an empirically observed trait-intersection count of digital entities corresponding to training traits. The digital-trait-intersection system 106 may, for instance, count each digital entity corresponding to both a first training trait and a second training trait for a given time period to determine a ground-truth-trait-intersection count. The ground-truth-trait-intersection count 446, for instance, represents an empirically observed count of digital entities corresponding to training trait indicators 402a and 402b for the target-training-time period.

As further indicated by FIG. 4A, the digital-trait-intersection system 106 uses a loss function 448 to compare the estimated training-trait-intersection count 450 with the ground-truth-trait-intersection count 446. In some embodiments, the digital-trait-intersection system 106 uses a mean-squared-error ("MSE") function or a mean-absolute-percentage-error ("MAPE") function as the loss function 448. Alternatively, in some embodiments, the digital-trait-intersection system 106 uses an L2-loss function, mean-absolute-error function, a root-mean-squared-error function, or other suitable loss function as the loss function 448.

Upon determining a loss from the loss function 448, the digital-trait-intersection system 106 adjusts parameters (e.g., weights or values) of one or both of the machine-learning model 410 and the semantic-word-vector model 404 to decrease a loss for the loss function 448 in a subsequent training iteration. For example, the digital-trait-intersection system 106 may increase or decrease weights or values from some (or all) of the trait-embedding matrix 408, the network layers 420, the time-segment matrix 430, the time-segment matrix 440, or the network layers 452 within the machine-learning model 410 to decrease or minimize a loss in a subsequent training iteration. Similarly, in certain embodiments, the digital-trait-intersection system 106 may further increase or decrease one or more hyperparameters of the semantic-word-vector model 404 to decrease or minimize a loss in a subsequent training iteration. By adjusting such hyperparameters, the digital-trait-intersection system 106 can tune semantic-embedding vectors between training iterations.

As further suggested by FIG. 4A, after adjusting parameters of the machine-learning model 410 for an initial training iteration, the digital-trait-intersection system 106 can perform additional training iterations. In a subsequent training iteration, for instance, the digital-trait-intersection system 106 generates semantic-embedding-training vectors from training trait indicators. The training trait indicators in the subsequent training iteration may represent a same or a different pair of training traits than the training trait indicators 402a and 402b. As part of such a subsequent training iteration, the digital-trait-intersection system 106 inputs an initial trait-intersection-training count into the machine-learning model 410 to generate a trait-intersection-count-training vector. The digital-trait-intersection system 106 further uses the machine-learning model 410 to generate an estimated training-trait-intersection count based on the semantic-embedding-training vectors and the initial trait-intersection count.

Continuing the subsequent training iteration, the digital-trait-intersection system 106 further determines a loss from the loss function 448 and adjusts parameters of the machine-learning model 410 based on the determined loss. In some cases, the digital-trait-intersection system 106 performs training iterations until the value or weights of the machine-learning model 410 do not change significantly across training iterations or otherwise satisfies a convergence criteria. Additionally, or alternatively, the digital-trait-intersection system 106 performs training iterations using training trait indicators and corresponding initial trait-intersection-training counts for training-periods spanning multiple years (e.g., a span of two to three years).

In addition to the training iterations shown in FIG. 4A, in some embodiments, the digital-trait-intersection system 106 uses pseudo labels for new training-time periods to train the machine-learning model 410. In some embodiments, for instance, the digital-trait-intersection system 106 uses a previously trained version of the machine-learning model 410 (or a different machine-learning model) to generate an estimated training-trait-intersection count from test traits that lack a corresponding ground-truth-trait-intersection count for a new training-time period. As just implied, a test trait is a training trait without a corresponding ground-truth-trait-intersection count. The estimated training-trait-intersection count for the test traits becomes a pseudo label for the test traits. The digital-trait-intersection system 106 can generate a set of pseudo labels for different pairs of test traits. The digital-trait-intersection system 106 subsequently trains the machine-learning model 410 by using pairs of test traits (with pseudo labels for comparison to an estimated trait-intersection-training count) and pairs of training traits (with ground-truth-trait-intersection counts for comparison to an estimated trait-intersection-training count) to generate semantic-trait-training embeddings as inputs for the machine-learning model 410. In some such embodiments, the digital-trait-intersection system 106 concatenates the pairs of test traits and the pairs of training traits as inputs.

In addition (or in the alternative) to an initial trait-intersection-training count, in some embodiments, the digital-trait-intersection system 106 analyzes different types (e.g., different metrics) of trait-intersection-training counts. For example, in generating an estimated trait-intersection-training count, the digital-trait-intersection system 106 can analyze trait-intersection-training counts comprising a rolling mean, median, minimum, or maximum of trait-intersection-training counts. In some cases, the digital-trait-intersection system 106 determines (and generates a feature vector for) a rolling mean, median, minimum, or maximum of trait-intersection-training count for a timeframe as an input for the machine-learning model 410.

For example, in some embodiments, the digital-trait-intersection system 106 determines, for multiple training-time periods or fragments of a training-time period, a rolling average trait-intersection-training count of digital entities corresponding to training trait indicators (e.g., a rolling mean or a rolling median of trait-intersection-training counts across multiple training-time periods or fragments of a training-time period). Such multiple training-time periods may include, for instance, training-time periods spanning one to four months of trait-intersection counts, with a count for each day, each week, or each subperiod (e.g., each seventh and thirtieth day). With each additional training-time period for which the digital-trait-intersection system 106 determines an empirically observed trait-intersection count, the digital-trait-intersection system 106 can adjust an average to create the rolling average trait-intersection-training count.

As a further example of a dynamic trait-intersection count, in some embodiments, the digital-trait-intersection system 106 determines, for multiple training-time periods (or fragments of a training-time period), a rolling extremum trait-intersection-training count of digital entities corresponding to training trait indicators. In some such cases, the digital-trait-intersection system 106 uses a rolling minimum or maximum trait-intersection-training count for a timeframe (e.g., multiple training-time periods or fragments of a training-time period) by selecting a minimum or maximum trait-intersection-training count for the timeframe upon determining a count for each new fragment of the timeframe. In certain embodiments involving a decision-tree regressor, the digital-trait-intersection system 106 optionally further ranks polynomial features of an initial trait-intersection-training count and determines a ratio of trait-intersection-training count pairs (e.g., a ratio of a first trait-intersection-training count for a first training-time period over a second trait-intersection-training count for a second training-time period).

When using such alternative trait-intersection-training counts, the digital-trait-intersection system 106 can analyze the counts (or polynomial features or ratios of counts) in a similar manner to the initial trait-intersection-training count 414. For instance, the digital-trait-intersection system 106 can use the network layers 420 of the machine-learning model 410 to generate a trait-intersection-count-training vector for a rolling average trait-intersection-training count or a rolling extremum trait-intersection-training count and include such a training vector in a combined-trait-intersection-training vector.

Figure 4B:
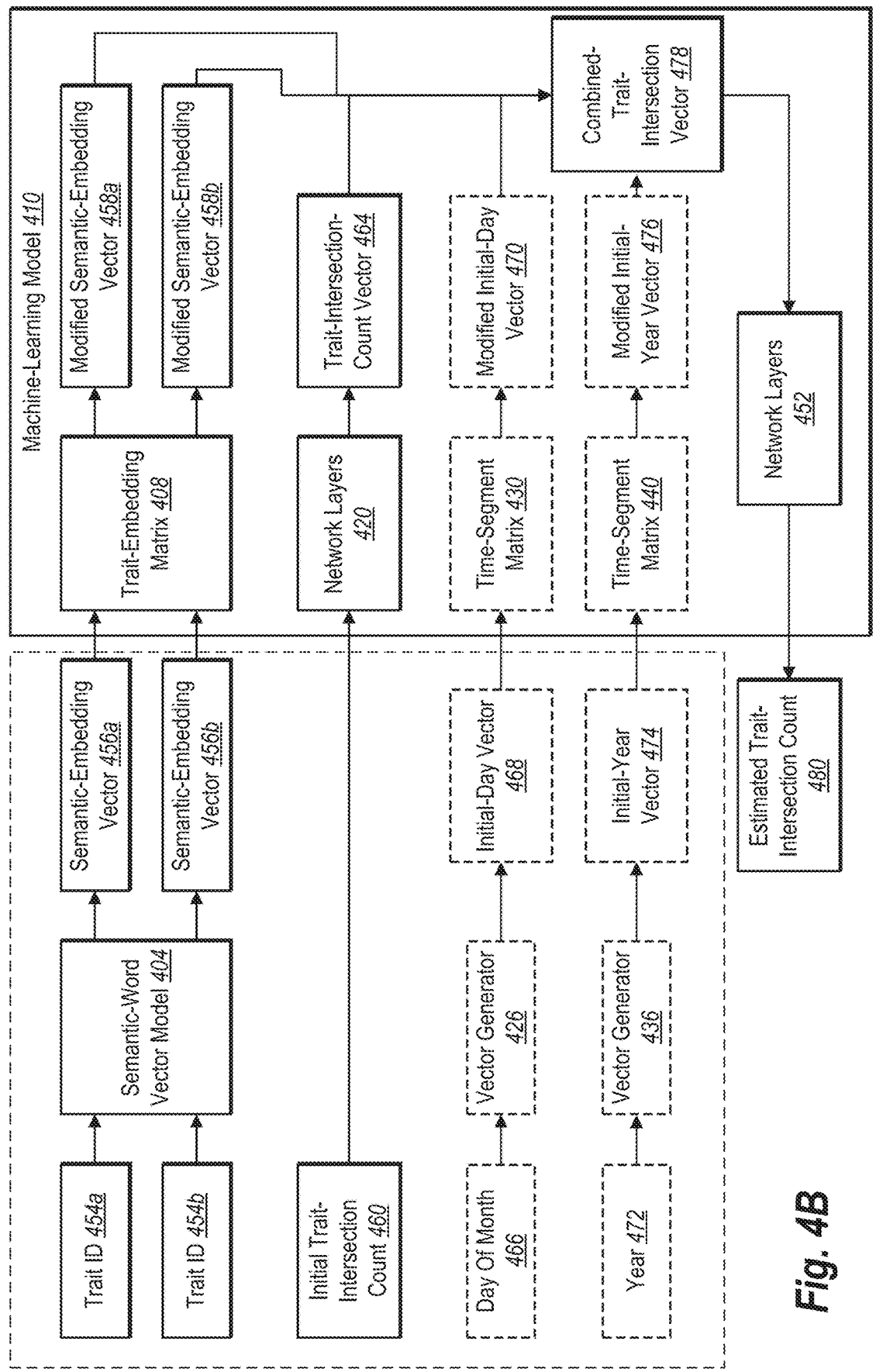
FIG. 4B illustrates the digital-trait-intersection system applying a machine-learning model to generate an estimated trait-intersection count in accordance with one or more embodiments.

In addition to training a machine-learning model, in some embodiments, the digital-trait-intersection system 106 applies the machine-learning model to generate an estimated trait-intersection count. FIG. 4B depicts an example of one such application. As shown in FIG. 4B, in response to a trait-intersection-count request for a target time period, the digital-trait-intersection system 106 applies the semantic-word-vector model 404 to trait indicators 454a and 454b to generate semantic-embedding vectors 456a and 456b. The digital-trait-intersection system 106 further inputs into the machine-learning model 410 an initial trait-intersection count 460 of digital entities corresponding to the trait indicators 454a and 454b for an initial time period. Based on the trait-intersection-count request, the digital-trait-intersection system 106 generates an estimated trait-intersection count 480 of digital entities corresponding to the trait indicators 454a and 454b for the target time period by analyzing the semantic-embedding vectors 456a and 456b and the initial trait-intersection count 460 using the machine-learning model 410.

As just indicated, the digital-trait-intersection system 106 applies the semantic-word-vector model 404 to the trait indicators 454a and 454b. In some cases, such trait indicators each represent a term, phrase, number, alphanumeric, or other indicator of traits identified in a request for a trait-intersection count of digital entities corresponding to traits for a target time period. As noted above, such a trait-intersection-count request may indicate that one or both of the trait indicators 454a and 454b correspond to a segment of users in a segment-trait request for a trait-intersection count. Upon application, the semantic-word-vector model 404 outputs the semantic-embedding vectors 456a and 456b, which respectively correspond to the trait indicators 454a and 454b.

As further shown in FIG. 4B, the digital-trait-intersection system 106 inputs the semantic-embedding vectors 456a and 456b into the machine-learning model 410. When applying the machine-learning model 410, in some embodiments, the digital-trait-intersection system 106 applies the trait-embedding matrix 408 to the semantic-embedding vectors 456a and 456b. Upon application, the trait-embedding matrix 408 generates modified semantic-embedding vectors 458a and 458b, which respectively correspond to the semantic-embedding vectors 456a and 456b. As explained further below, in some embodiments, the machine-learning model 410 further combines the modified semantic-embedding vectors 458a and 458b with one or more other modified vectors to generate a combined-trait-intersection vector 478.

In addition to analyzing the trait indicators 454a and 454b, the digital-trait-intersection system 106 analyzes the initial trait-intersection count 460 of digital entities corresponding to the trait indicators 454a and 454b for an initial time period. In particular, the digital-trait-intersection system 106 inputs the initial trait-intersection count 460 into the machine-learning model 410. In some embodiments, the digital-trait-intersection system 106 provides the initial trait-intersection count 460 to the network layers 420 to generate a trait-intersection-count vector 464. As explained further below, in some cases, the machine-learning model 410 also combines the trait-intersection-count vector 464 with other modified vectors as part of the combined-trait-intersection vector 478.

In addition to the trait indicators 454a and 454b and the initial trait-intersection count 460, in some embodiments, the digital-trait-intersection system 106 further analyzes time-segment indicators corresponding to the initial time period. FIG. 4B depicts a day of month 466 and a year 472 as examples of such time-segment indicators. Both the day of month 466 and the year 472 correspond to the initial time period for the initial trait-intersection count 460.

As further shown in FIG. 4B, in certain implementations, the digital-trait-intersection system 106 applies the vector generator 426 to the day of month 466 to generate an initial-day vector 468. Similarly, the digital-trait-intersection system 106 applies the vector generator 436 to the year 472 to generate an initial-year vector 474. The digital-trait-intersection system 106 subsequently inputs the initial-day vector 468 and the initial-year vector 474 into the machine-learning model 410. As part of applying the machine-learning model 410, the digital-trait-intersection system optionally applies the time-segment matrix 430 and the time-segment matrix 440 respectively to the initial-day vector 468 and the initial-year vector 474. Upon application, the time-segment matrix 430 and the time-segment matrix 440 respectively generate a modified initial-day vector 470 and a modified initial-year vector 476.

In addition to generating the various modified vectors shown in FIG. 4B, the digital-trait-intersection system 106 uses the machine-learning model 410 to combine modified vectors to generate the combined-trait-intersection vector 478. For example, in some embodiments, the digital-trait-intersection system 106 combines or concatenates the modified semantic-embedding vectors 458a and 458b and the trait-intersection-count vector 464 to generate the combined-trait-intersection vector 478. Additionally, or alternatively, in certain implementations, the digital-trait-intersection system 106 further combines the modified initial-day vector 470 and the modified initial-year vector 476 with other modified vectors to generate the combined-trait-intersection vector 478.

As further depicted in FIG. 4B, the digital-trait-intersection system 106 uses the machine-learning model 410 to input the combined-trait-intersection vector 478 into the network layers 452 to generate the estimated trait-intersection count 480. As indicated above, the estimated trait-intersection count 480 represents a count of digital entities corresponding to the trait indicators 454a and 454b for the target time period. Accordingly, in response to a request for a trait-intersection count of digital entities corresponding to the trait indicators 454a and 454b for a target time period, the digital-trait-intersection system 106 uses the machine-learning model 410 to generate the estimated trait-intersection count 480 for the target time period.

In addition (or in the alterative) to an initial trait-intersection count, in some embodiments, the digital-trait-intersection system 106 uses a different type of trait-intersection count as a basis for generating an estimated trait-intersection count, such as by analyzing a rolling mean, median, minimum, or maximum of trait-intersection-training counts for a timeframe (e.g., for multiple time periods or for multiple fragments of a time period). For example, in some embodiments, the digital-trait-intersection system 106 determines, for multiple time periods or fragments of a time period, a rolling average trait-intersection count of digital entities corresponding to trait indicators. As a further example, in certain implementations, the digital-trait-intersection system 106 determines, for multiple time periods or fragments of a time period, a rolling extremum trait-intersection count of digital entities corresponding to trait indicators. Consistent with the training described above, the digital-trait-intersection system 106 can use the network layers 420 to generate a trait-intersection-count vector for either a rolling average trait-intersection count or a rolling extremum trait-intersection count and include such a vector in a combined-trait-intersection vector.

Figure 5:
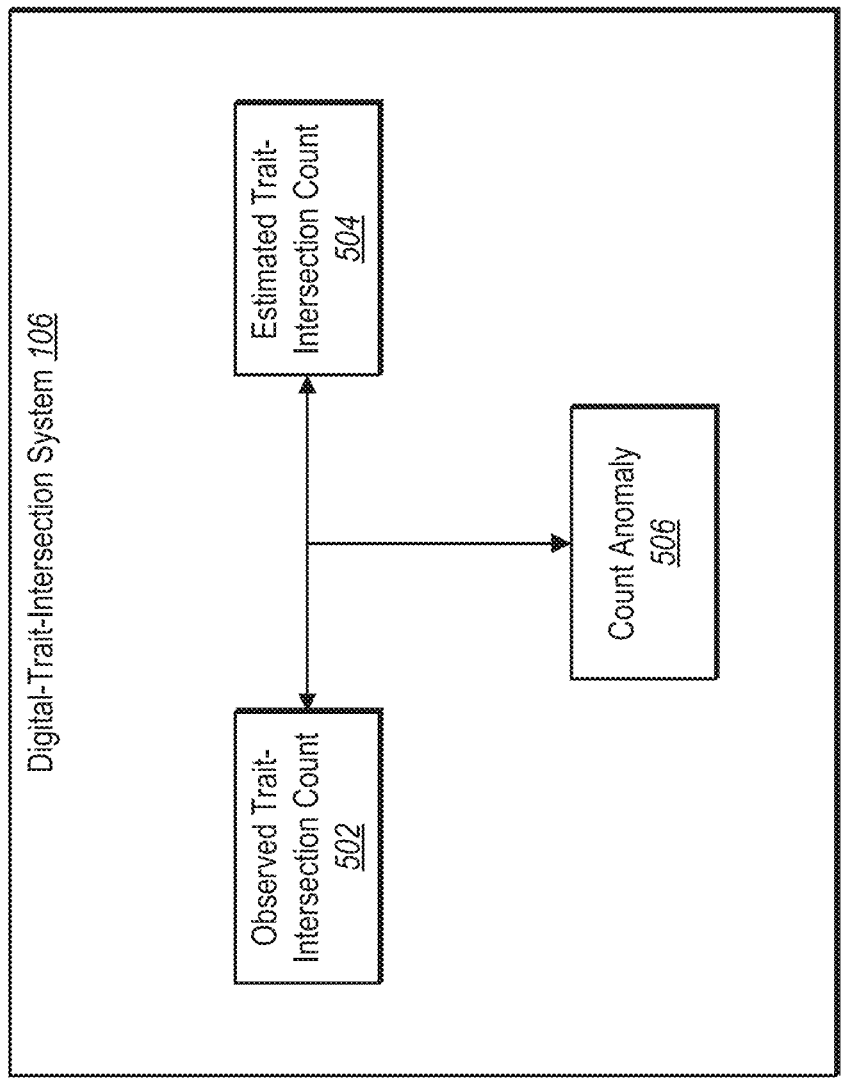
FIG. 5 illustrates the digital-trait-intersection system determining a count anomaly in accordance with one or more embodiments.

As further suggested above, the digital-trait-intersection system 106 can use an estimated trait-intersection count in a variety of applications. In certain implementations, for example, the digital-trait-intersection system 106 uses an estimated trait-intersection count to identify anomalies in trait-intersection counts. FIG. 5 illustrates an example of the digital-trait-intersection system 106 determining an observed trait-intersection count 502 and comparing the observed trait-intersection count 502 with an estimated trait-intersection count 504 to identify a count anomaly 506.

As shown in FIG. 5, the digital-trait-intersection system 106 determines the observed trait-intersection count 502 of digital entities corresponding to two or more traits for a time period. In some embodiments, the digital-trait-intersection system 106 determines the observed trait-intersection count 520 by counting digital entities one by one that correspond to the two or more traits at (or during) a time period. Such a time period may be an initial time period or a target time period. The digital-trait-intersection system 106 further generates the estimated trait-intersection count 504 of digital entities corresponding to the two or more traits for the time period by using a machine-learning model. For instance, the digital-trait-intersection system 106 applies the machine-learning model 410 to determine the estimated trait-intersection count 504, as demonstrated in FIG. 4B.

As further indicated by FIG. 5, the digital-trait-intersection system 106 compares the observed trait-intersection count 502 to the estimated trait-intersection count 504 to determine a count difference between the counts. In some cases, the digital-trait-intersection system 106 determines that a count difference between the observed trait-intersection count 502 and the estimated trait-intersection count 504 satisfies a difference threshold. Such a difference threshold can comprise a percentage difference by determining that the observed trait-intersection count 502 is more or less than (or equal to) a particular percentage of the estimated trait-intersection count 504 (or vice versa). Additionally, or alternatively, the difference threshold can comprise a threshold number, where the digital-trait-intersection system 106 determines that the observed trait-intersection count 502 is more or less than the estimated trait-intersection count 504 by a preset threshold number (or vice versa).

Based on determining that the count difference satisfies (or exceeds) the difference threshold, the digital-trait-intersection system 106 identifies the count anomaly 506 for one or more traits. Because such a count difference satisfies (or exceeds) a difference threshold—and the machine-learning model has been trained to accurately estimate trait-intersection counts—the count anomaly 506 can indicate that underlying data for the observed trait-intersection count 502 is inaccurate or a process of counting digital entities for the observed trait-intersection count 520 is inaccurate. The count anomaly 506 may be specific to one trait (or applicable to all traits) from the two or more traits for which the digital-trait-intersection system 106 determines the observed trait-intersection count 502.

In some cases, the digital-trait-intersection system 106 further notifies an administrator device of the count anomaly 506. For instance, in certain implementations, the digital-trait-intersection system 106 receives a request from the administrator device 114 for an anomaly report or for data anomalies including trait-intersection counts. In response such a request, the digital-trait-intersection system 106 identifies and sends an indication of the count anomaly 506 to the administrator device 114 for display within a graphical user interface of the administrator device 114.

Figure 6:
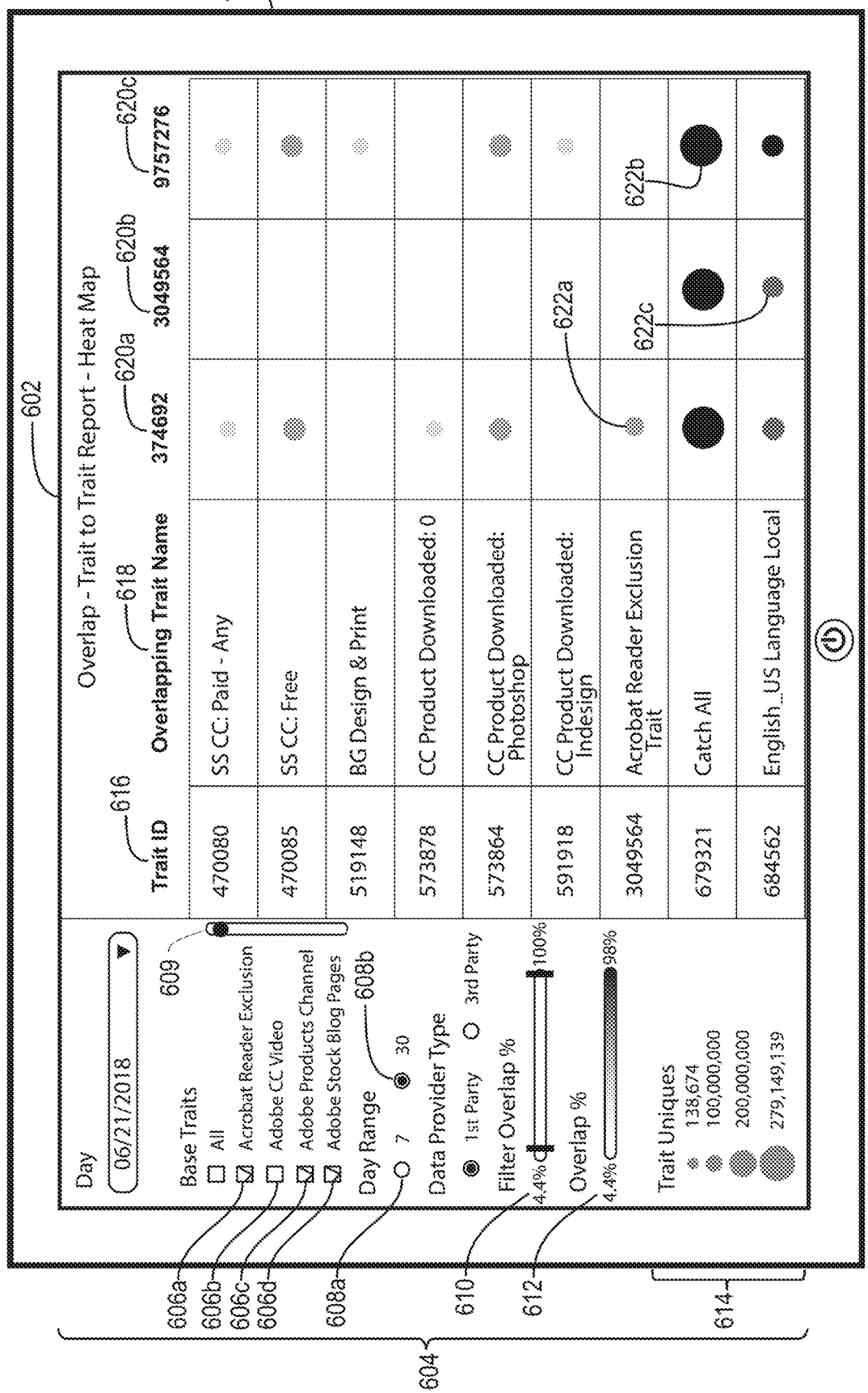
FIG. 6 illustrates a computing device presenting a graphical user interface for estimated trait-intersection counts in accordance with one or more embodiments.

In addition (or in the alternative) to display of a count anomaly, the digital-trait-intersection system 106 can generate an estimated trait-intersection count for display within a graphical user interface in response to receiving a trait-intersection-count request. FIG. 6 depicts the administrator device 114 presenting a graphical user interface 604 for estimated trait-intersection counts in accordance with one or more embodiments. As indicated by FIG. 6, the digital-trait-intersection system 106 receives a request from the administrator device 114 for a trait-intersection count corresponding to traits indicated by selectable-trait options 606a and 606c for a target time period indicated by a time-period option 608b. Based on the request, the digital-trait-intersection system 106 generates an estimated trait-intersection count corresponding to the traits for the target time period for display as an estimated-count indicator 622a. FIG. 6 also depicts additional trait-intersection-count requests and estimated-count indicators described below.

As shown in FIG. 6, the administrator device 114 presents the graphical user interface 604 of the analytics application 116 within a screen 602 of a computing device. The graphical user interface 604 includes selectable-trait options 606a-606d each corresponding to a different trait. As indicated by FIG. 6, the administrator device 114 detects user selections by the administrator 118 of the selectable-trait options 606a, 606c, and 606d. As indicated by a scroll bar 609, the digital-trait-intersection system 106 provides additional selectable-trait options corresponding to additional traits. Upon detecting a user interaction by the administrator 118 scrolling through the scroll bar 609, the administrator device 114 presents one or more of the additional selectable-trait options. Although not shown in FIG. 6, the administrator device 114 further detects user selection by the administrator 118 of some additional selectable-trait options currently hidden from view within the graphical user interface 604.

As further shown in FIG. 6, the graphical user interface 604 also includes time-period options 608a and 608b corresponding to potential target time periods. In this example, the administrator device 114 detects a user selection by the administrator 118 of the time-period option 608b corresponding to a particular target time period. As indicated by markings for the selectable-trait options 606a, 606c, and 606d and the time-period option 608b, the administrator device 114 sends at least three trait-intersection-count requests to the digital-trait-intersection system 106.

In particular, the administrator device 114 sends (i) a request for a trait-intersection count of digital entities corresponding to traits indicated by the selectable-trait options 606a and 606c for the target time period, (ii) a request for a trait-intersection count of digital entities corresponding to traits indicated by the selectable-trait options 606a and 606d for the target time period, and (iii) a request for a trait-intersection count of digital entities corresponding to traits indicated by the selectable-trait options 606c and 606d for the target time period. Although not shown in FIG. 6, the administrator device 114 sends additional trait-intersection-count requests corresponding to additional traits indicated by additional selectable-trait options currently hidden from view in the graphical user interface 604.

Based on the trait-intersection-count requests, the digital-trait-intersection system 106 generates various estimated trait-intersection counts for display as estimated-count indicators 622a, 622b, and 622c within the graphical user interface 604. As shown in FIG. 6, the graphical user interface 604 includes various columns to which estimated-count indicators correspond. For example, the graphical user interface 604 includes a trait-indicator column 616, a trait-name column 618, and overlapping-trait-indicator columns 620a-620c. The trait-indicator column 616 includes trait indicators for various traits selected by the administrator 118. The trait-name column 618 includes corresponding trait names or descriptions for the various traits. The overlapping-trait-indicator columns 620a-620c include estimated-count indicators for estimated trait-intersection counts that correspond to the trait indicators in both the rows of the trait-indicator column and in the heading of the overlapping-trait-indicator columns 620a-620c.

As indicated by estimated-count indicators in the overlapping-trait-indicator columns 620a-620c, the digital-trait-intersection system 106 can extemporaneously generate multiple estimated trait-intersection counts corresponding to various traits for a target time period in response to multiple trait-intersection-count requests. For example, the digital-trait-intersection system 106 generates an estimated trait-intersection count for display as the estimated-count indicator 622a corresponding to the traits indicated by the selectable-trait options 606a and 606c for the target time period. The digital-trait-intersection system 106 also generates estimated trait-intersection counts for display as the estimated-count indicators 622b and 622c corresponding to various other pairs of traits for the target time period.

As further shown in FIG. 6, the graphical user interface 604 includes an overlap-degree indicator 612 and a count-quantity key 614 that respectively indicate the degree of trait intersection and the quantity of trait intersection illustrated by the estimated-count indicators. While the overlap-degree indicator 612 includes a color scale or a grey scale indicating a degree of trait intersection, the digital-trait-intersection system 106 can use other suitable keys, gradients, or indicators to indicate the degree of trait intersection. As indicated by the overlap-degree indicator 612, the estimated-count indicator 622a represents an estimated trait-intersection count with approximately 5-10% of digital entities that share traits corresponding to the selectable-trait options 606a and 606c. As indicated by the count-quantity key 614, the estimated-count indicator 622a represents an estimated trait-intersection count of approximately 100 million digital entities that share traits corresponding to the selectable-trait options 606a and 606c.

By contrast, the overlap-degree indicator 612 indicates that the estimated-count indicators 622b and 622c respectively represent estimated trait-intersection counts with approximately 95-100% and 45-50% of digital entities that share a pair of requested traits. The count-quantity key 614 indicates that the estimated-count indicators 622b and 622c represent estimated trait-intersection counts of approximately 279 million and 100 million digital entities that share a pair of requested traits.

As further shown in FIG. 6, the graphical user interface 604 also includes an overlap-degree filter 610. The overlap-degree filter 610 controls the estimated-count indicators shown in the graphical user interface 605 according to user selections of the degree of trait intersection. Upon detecting user interaction by the administrator 118 with one or more sliders within the overlap-degree filter 610, for example, the administrator device 114 filters the estimated-count indicators shown within the graphical user interface 604 according to a selected range of degree of trait intersection between traits. As indicated by FIG. 6, the administrator device 114 presents estimated-count indicators within a particular range of trait intersection according to the overlap-degree filter 610.

To assess the effectiveness of the digital-trait-intersection system 106, researchers conducted a series of tests to compare estimated trait-intersection counts generated by the digital-trait-intersection system 106 with ground-truth-trait-intersection counts. FIGS. 7A-7C illustrate tables reporting various error rates across tests of different machine-learning models implemented by the digital-trait-intersection system 106 in accordance with one or more embodiments.

As shown in FIG. 7A, for instance, researchers used a neural network and a XGBoost regressor respectively as machine-learning models for the digital-trait-intersection system 106 to generate estimated trait-intersection counts of users corresponding to traits for a target time period (i.e., over or spanning thirty days in a month). The researchers utilized the digital-trait-intersection system 106 to train the neural network by using semantic-embedding vectors for training-trait indicators, initial trait-intersection-training counts over or spanning seven days in a month, and rolling average trait-intersection-training counts or rolling extremum trait-intersection-training counts, consistent with the disclosure above. The researchers also utilized the digital-trait-intersection system 106 to train the XGBoost regressor by using semantic-embedding vectors for training-trait indicators, ranked polynomial features of initial trait-intersection-training counts over or spanning seven days in a month, rolling average trait-intersection-training counts, and ratios of trait-intersection-training count pairs, consistent with the disclosure above.

The researchers further determined an MSE and a MAPE for each machine-learning model by comparing the estimated trait-intersection counts generating with each machine-learning model with corresponding ground-truth-trait-intersection counts. As the table for FIG. 7A indicates, both the MSE and the MAPE for the XGBoost regressor were lower than those of the neural network. In either implementation of the XGBoost or the neural network, however, the digital-trait-intersection system 106 demonstrated significant accuracy in estimating trait-intersection counts.

As shown in FIG. 7B, researchers again used a machine-learning model for the digital-trait-intersection system 106 to generate estimated trait-intersection counts of users corresponding to traits for a target time period (i.e., over or spanning thirty days in a month). The researchers utilized the digital-trait-intersection system 106 to train the machine-learning model by using semantic-embedding vectors for training-trait indicators, initial trait-intersection-training counts over or spanning seven days in a month, and time-segment indicators for the seventh day in the month and the year corresponding to an initial time period, consistent with the disclosure above.

The researchers further determined mean, median, and ninetieth percentile MAPE intersection values and absolute error overlap for the initial time period (i.e., the seventh day of the month) over the target time period (i.e., the thirtieth day of the month) by comparing the estimated trait-intersection counts for the machine-learning model with corresponding ground-truth-trait-intersection counts. As the error vales in the table for FIG. 7B indicate, the digital-trait-intersection system 106 can accurately estimate trait-intersection counts by relying on both semantic-trait embeddings and initial trait-intersection counts for an initial time period.

As shown in FIG. 7C, researchers used a XGBoost regressor and a neural network respectively as machine-learning models for the digital-trait-intersection system 106 to generate estimated trait-intersection counts of users corresponding to traits for a target time period (i.e., over or spanning thirty days in a month). The researchers used the digital-trait-intersection system 106 to train each of the XGBoost regressor and neural network by using pre-trained semantic-embedding vectors for training-trait indicators, initial trait-intersection-training counts over or spanning seven days in a month, and time-segment indicators for the seventh day in the month and year, consistent with the disclosure above.

The researchers further determined an MSE and a MAPE for each machine-learning model by comparing the estimated trait-intersection counts for each machine-learning model with corresponding ground-truth-trait-intersection counts. As the table for FIG. 7C indicates, both the MSE and the MAPE for the XGBoost were lower than those of the neural network. In any implementation of the XGBoost or neural network, however, the digital-trait-intersection system 106 again demonstrated significant accuracy in estimating trait-intersection counts.

Figure 8:
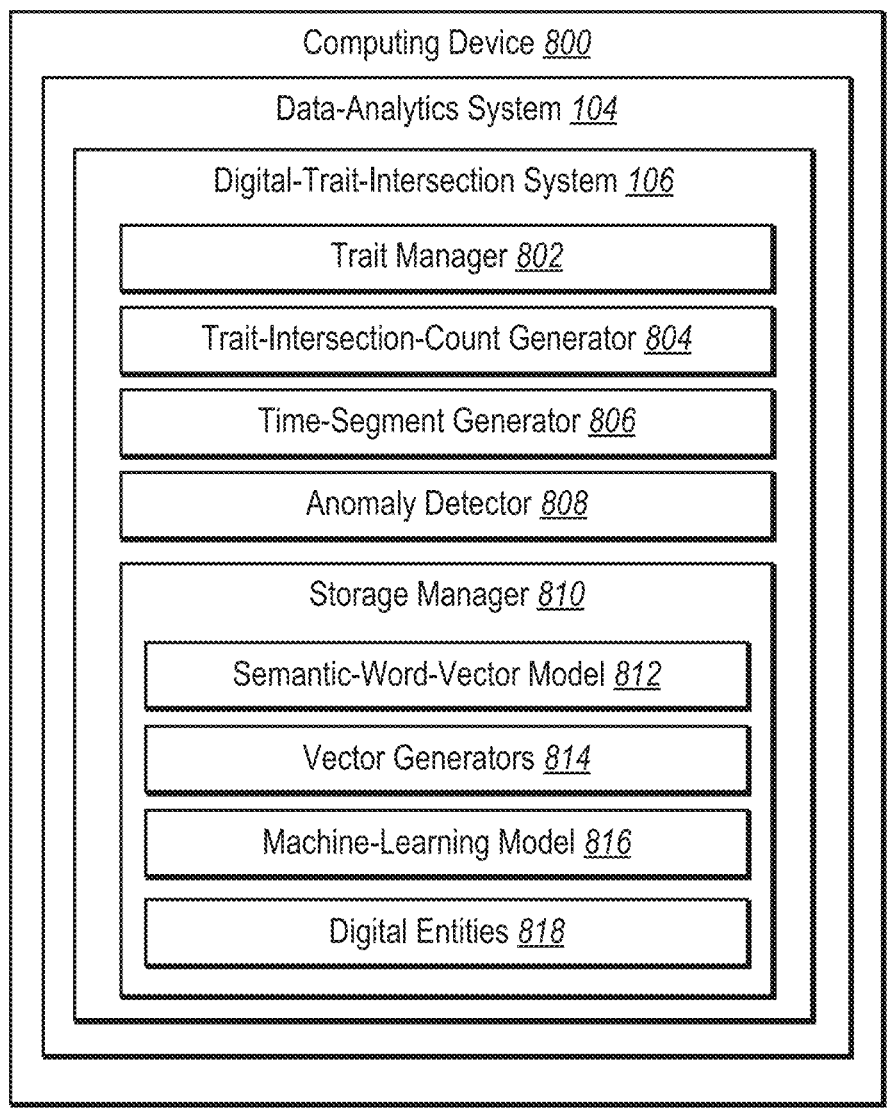
- FIG. 8 illustrates a schematic diagram of the digital-trait-intersection system of FIG. 1 in accordance with one or more embodiments.

Turning now to FIG. 8, this figure provides additional detail regarding components and features of the digital-trait-intersection system 106. In particular, FIG. 8 illustrates a computing device 800 implementing the data-analytics system 104 and the digital-trait-intersection system 106. In some embodiments, the computing device 800 comprises one or more servers (e.g., the server(s) 102). In other embodiments, the computing device 800 comprises one or more client devices (e.g., the administrator device 114).

As shown in FIG. 8, the computing device 800 includes the data-analytics system 104. In some embodiments, the data-analytics system 104 uses its components to perform various digital-analytics functions or digital-campaign functions. Additionally, in some cases, the data-analytics system 104 collects data corresponding to users, events, products, transactions, and/or touchpoints from the client devices (e.g., by collecting data tracking application uses, orders, purchases, or webpage views).

As further shown in FIG. 8, the computing device 800 includes the digital-trait-intersection system 106. The digital-trait-intersection system 106 includes, but is not limited to, a trait manager 802, a trait-intersection-count manager 804, a time-segment manager 806, and/or a storage manager 810. The following paragraphs describe each of these components in turn.

As just mentioned, the digital-trait-intersection system 106 includes the trait manager 802. The trait manager 802 analyzes user profiles and traits to generate semantic-trait embeddings, including semantic-trait-training embeddings. For example, in some embodiments, the trait manager 802 communicates with the storage manager 810 to access and apply a semantic-word-vector model 812 to traits to generate semantic-trait embeddings. In some such embodiments, the trait manager 802 trains or applies the semantic-word-vector model 812 as illustrated in FIGS. 4A and 4B, respectively. In certain embodiments, the time-segment manager 806 further communicates with the storage manager 810 to apply and/or access the semantic-word-vector model 812.

As further shown in FIG. 8, the trait-intersection-count manager 804 identifies trait-intersection-count requests and determines and estimates trait-intersection counts. For example, in some embodiments, the trait-intersection-count manager 804 determines initial trait-intersection counts for training or application of a machine-learning model 816. In some cases, the trait-intersection-count manager 804 generates trait-intersection-count vectors using one of the vector generators 814 during a training or application of the machine-learning model 816. In some such embodiments, the trait-intersection-count manager 804 trains or applies the machine-learning model 816 as illustrated in FIGS. 4A and 4B, respectively. The trait-intersection-count manager 804 further communicates with the storage manager 810 to apply and/or access a vector generator from the vector generators 814 and/or the machine-learning model 816.

As further shown in FIG. 8, the time-segment manager 806 accesses time-segment indicators and generates (or inputs) time-segment vectors for the digital-trait-intersection system 106. For example, in some embodiments, the time-segment manager 806 accesses or determines an initial day of month or an initial year corresponding to an initial trait-intersection count (and initial time period) and generates an initial-day vector and an initial-year vector for the machine-learning model 816. In some such embodiments, the time-segment manager 806 generates time-segment vectors as illustrated in FIG. 4A or 4B, respectively. In some embodiments, the time-segment manager 806 further communicates with the storage manager 810 to apply and/or access vector generators from the vector generators 814 to generate time-segment vectors.

In addition (or in the alternative) to the semantic-word-vector model 812, the vector generators 814, and the machine-learning model 816, in some embodiments, the storage manager 810 accesses and/or maintains digital entities 818. In some such embodiments, for instance, the storage manager 810 maintains a record of digital user profiles as the digital entities 818 and traits corresponding to individual user profiles and/or a record of other digital entities (e.g., events, products, or transactions) and traits corresponding to individual digital entities.

In one or more embodiments, each of the components of the digital-trait-intersection system 106 are in communication with one another using any suitable communication technologies. Additionally, the components of the digital-trait-intersection system 106 can be in communication with one or more other devices including one or more client devices described above. Although the components of the digital-trait-intersection system 106 are shown to be separate in FIG. 8, any of the subcomponents may be combined into fewer components, such as into a single component, or divided into more components as may serve a particular implementation. Furthermore, although the components of FIG. 8 are described in connection with the digital-trait-intersection system 106, at least some of the components for performing operations in conjunction with the digital-trait-intersection system 106 described herein may be implemented on other devices within the environment 100.

Each of the components 802-818 of the digital-trait-intersection system 106 can include software, hardware, or both. For example, the components 802-818 can include one or more instructions stored on a computer-readable storage medium and executable by processors of one or more computing devices, such as a client device or server device. When executed by the one or more processors, the computer-executable instructions of the digital-trait-intersection system 106 can cause the computing device(s) to perform the methods described herein. Alternatively, the components 802-818 can include hardware, such as a special-purpose processing device to perform a certain function or group of functions. Alternatively, the components 802-818 of the digital-trait-intersection system 106 can include a combination of computer-executable instructions and hardware.

Furthermore, the components 802-818 of the digital-trait-intersection system 106 may, for example, be implemented as one or more operating systems, as one or more stand-alone applications, as one or more generators of an application, as one or more plug-ins, as one or more library functions or functions that may be called by other applications, and/or as a cloud-computing model. Thus, the components 802-818 may be implemented as a stand-alone application, such as a desktop or mobile application. Furthermore, the components 802-818 may be implemented as one or more web-based applications hosted on a remote server. The components 802-818 may also be implemented in a suite of mobile device applications or "apps." To illustrate, the components 802-818 may be implemented in a software application, including, but not limited to, ADOBE EXPERIENCE CLOUD, ADOBE MARKETING CLOUD, ADOBE CAMPAIGN, and ADOBE ANALYTICS. "ADOBE," "EXPERIENCE CLOUD," "CAMPAIGN," "MARKETING CLOUD," and "ANALYTICS" are either registered trademarks or trademarks of Adobe Systems Incorporated in the United States and/or other countries.

Figure 9:
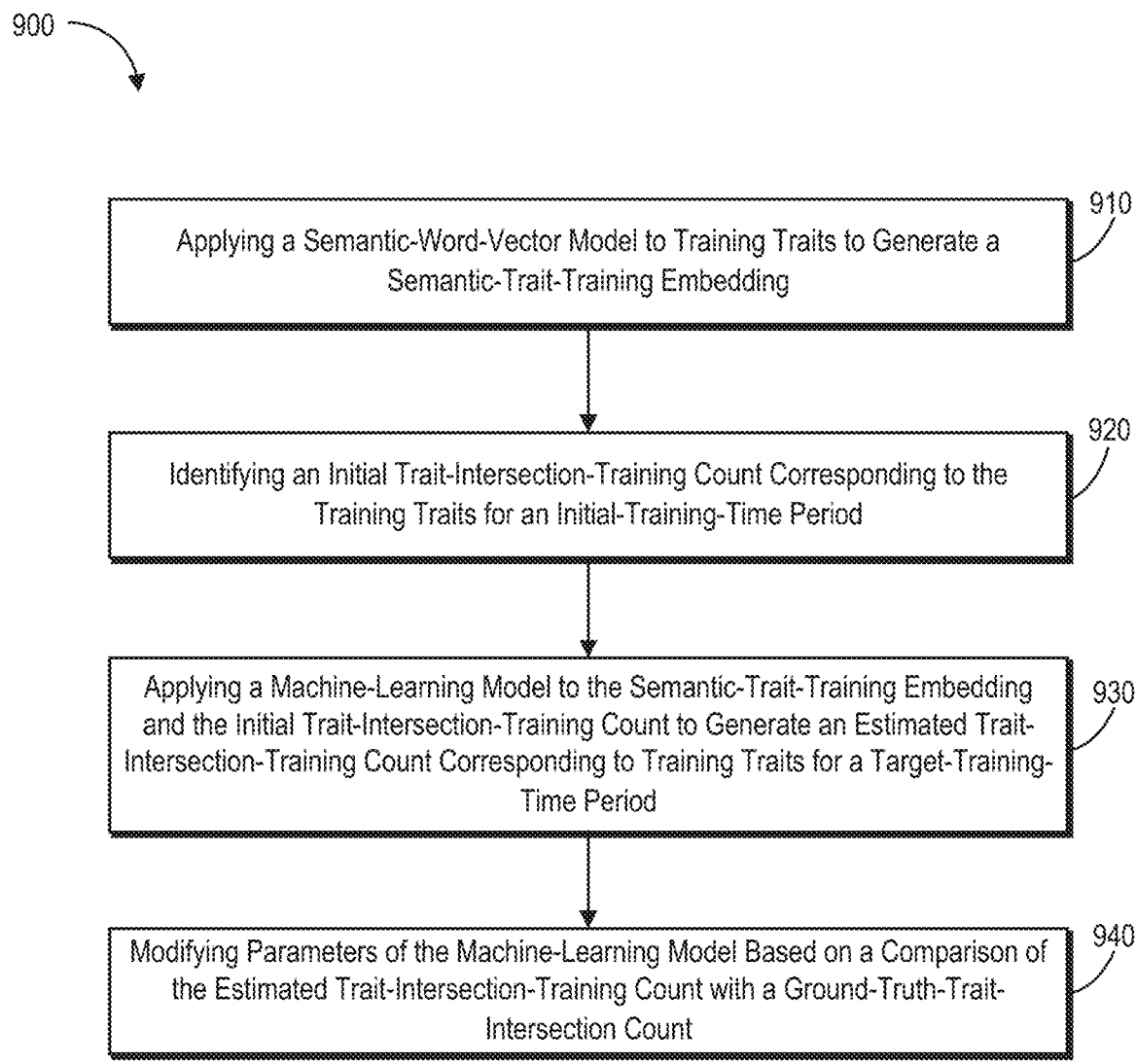
FIG. 9 illustrates a flowchart of a series of acts for training a machine-learning model to estimate a trait-intersection count for a target time period in accordance with one or more embodiments.

Turning now to FIG. 9, this figure illustrates a flowchart of a series of acts 900 of training a machine-learning model to estimate a trait-intersection count for a target time period in accordance with one or more embodiments. While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer readable storage medium can comprise instructions that, when executed by one or more processors, cause a computing device to perform the acts depicted in FIG. 9. In still further embodiments, a system can perform the acts of FIG. 9.

As shown in FIG. 9, the acts 900 include an act 910 of applying a semantic-word-vector model to generate a semantic-trait-training embedding. In particular, in some embodiments, the act 910 includes applying a semantic-word-vector model to a first training trait from a plurality of training traits and a second training trait from the plurality of training traits to generate a semantic-trait-training embedding. In certain implementations, generating the semantic-trait-training embedding comprises generating a first semantic-embedding-training vector for the first training trait and a second semantic-embedding-training vector for the second training trait.

As further shown in FIG. 9, the acts 900 include an act 920 of identifying an initial trait-intersection-training count corresponding to the training traits for an initial-training-time period. In particular, in some embodiments, the act 920 includes identifying an initial trait-intersection-training count of users corresponding to the first training trait and the second training trait for an initial-training-time period. Further, in some embodiments, the act 920 includes generating a trait-intersection-count-training vector for the initial trait-intersection-training count by applying network layers of the machine-learning model to the initial trait-intersection-training count.

As further shown in FIG. 9, the acts 900 include an act 930 of applying a machine-learning model to the semantic-trait-training embedding and the initial trait-intersection-training count to generate an estimated trait-intersection-training count corresponding to training traits for a target-training-time period. In particular, in certain implementations, the act 930 includes applying the machine-learning model to the semantic-trait-training embedding and the initial trait-intersection-training count to generate an estimated trait-intersection-training count of users corresponding to the first training trait and the second training trait for a target-training-time period. In some cases, the machine-learning model comprises a decision-tree regressor or an artificial neural network.

For example, in some embodiments, generating the estimated trait-intersection-training count for the target-training-time period utilizing the machine-learning model comprises: generating a first modified semantic-embeddingtraining vector for the first training trait and a second modified semantic-embedding-training vector for the second training trait by applying a trait-embedding matrix of the machine-learning model to the first semantic-embedding-training vector and the second semantic-embedding-training vector; and combining the first modified semantic-embedding-training vector, the second modified semantic-embedding-training vector, and the trait-intersection-count-training vector to create a combined-trait-intersection-training vector.

Relatedly, in one or more embodiments, generating the estimated trait-intersection-training count for the target-training-time period utilizing the machine-learning model comprises applying additional network layers of the machine-learning model to the combined-trait-intersection-training vector to determine the estimated trait-intersection-training count for the target-training-time period.

As further shown in FIG. 9, the acts 900 include an act 940 of modifying parameters of the machine-learning model based on a comparison of the estimated trait-intersect-training count with a ground-truth-trait-intersection count. In particular, in certain embodiments, the act 940 includes modifying parameters of the machine-learning model based on a comparison of the estimated trait-intersection-training count for the target-training-time period with a ground-truth-trait-intersection count of users corresponding to the first training trait and the second training trait for the target-training-time period.

In addition to the acts 910-940, in certain implementations, the acts 900 further include identifying a time-segment-training indicator corresponding to the initial-training-time period for the initial trait-intersection-training count; and generating the estimated trait-intersection-training count for the target-training-time period in part by analyzing the time-segment-training indicator utilizing the machine-learning model.

Additionally, in one or more embodiments, the acts 900 further include determining, for a plurality of training-time periods, a rolling average trait-intersection-training count of users corresponding to the first training trait and the second training trait or a rolling extremum trait-intersection-training count of users corresponding to the first training trait and the second training trait; and generating the estimated trait-intersection-training count for the target-training-time period in part by analyzing the rolling average trait-intersection-training count or the rolling extremum trait-intersection-training count utilizing the machine-learning model.

Figure 10:
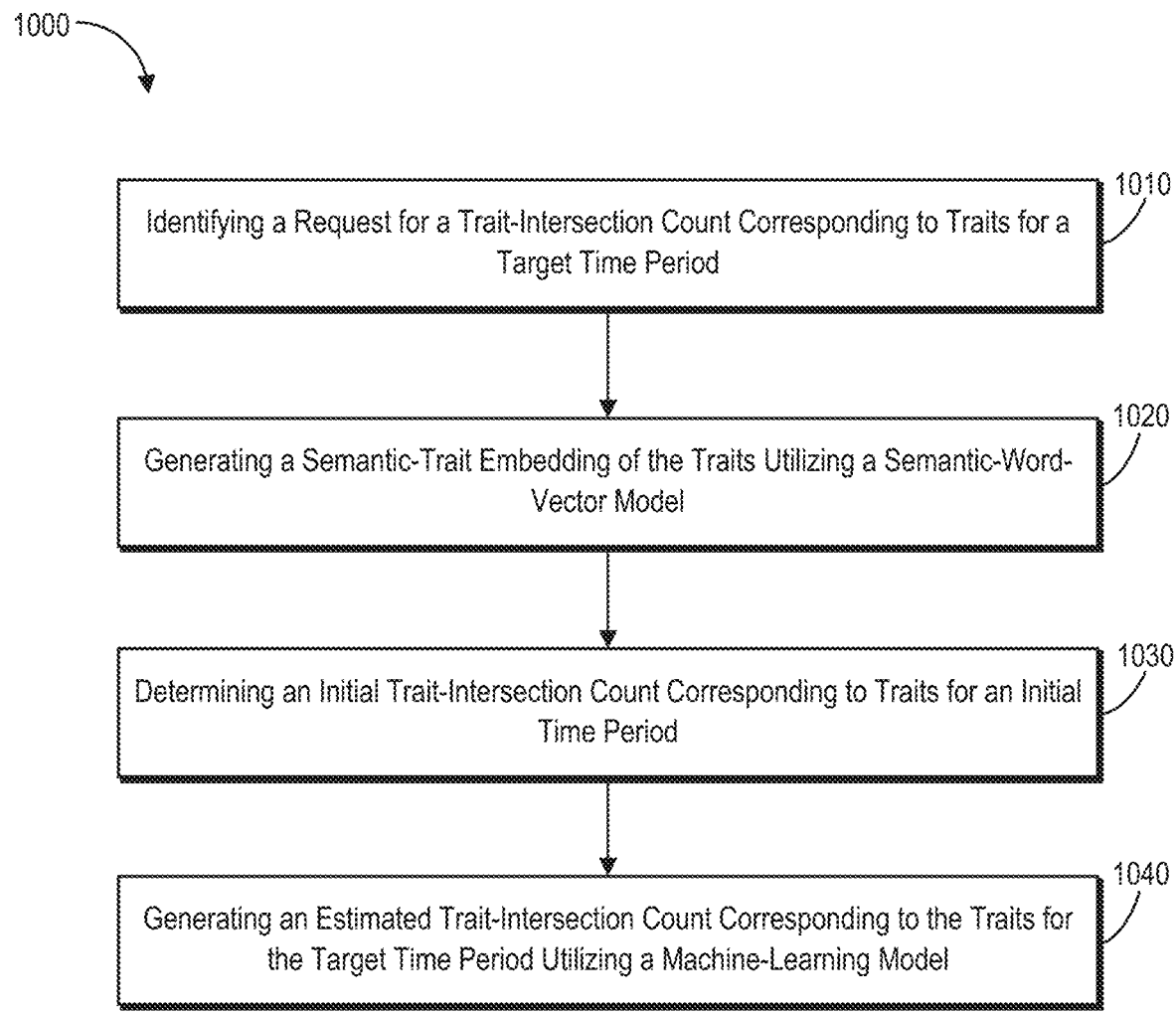
FIG. 10 illustrates a flowchart of a series of acts for using a machine-learning model to estimate a trait-intersection count for a target time period in accordance with one or more embodiments.

Turning now to FIG. 10, this figure illustrates a flowchart of a series of acts 1000 of using a machine-learning model to estimate a trait-intersection count for a target time period in accordance with one or more embodiments. While FIG. 10 illustrates acts according to one embodiment, alternative embodiments may omit, add to, reorder, and/or modify any of the acts shown in FIG. 10. The acts of FIG. 10 can be performed as part of a method. Alternatively, a non-transitory computer readable storage medium can comprise instructions that, when executed by one or more processors, cause a computing device to perform the acts depicted in FIG. 10. In still further embodiments, a system can perform the acts of FIG. 10.

As shown in FIG. 10, the acts 1000 include an act 1010 of identifying a request for a trait-intersection count corresponding to traits for a target time period. In particular, in some embodiments, the act 1010 includes identifying a request for a trait-intersection count of digital entities corresponding to a first trait and a second trait for a target time period. In certain cases, the trait-intersection count of digital entities comprises a trait-intersection count of events, products, users, or transactions. As an example of the act 1010, in some embodiments, identifying the request for the trait-intersection count comprises identifying a segment-trait request for a trait-intersection count of users corresponding to the first trait and a segment for the second trait for the target time period.

As further shown in FIG. 10, the acts 1000 include an act 1020 of generating a semantic-trait embedding of the traits utilizing a semantic-word-vector model. In particular, in some embodiments, the act 1020 includes generating a semantic-trait embedding of the first trait and the second trait utilizing a semantic-word-vector model. For example, in some cases, generating the semantic-trait embedding comprises generating a first semantic-embedding vector for the first trait and a second semantic-embedding vector for the second trait.

As further shown in FIG. 10, the acts 1000 include an act 1030 of determining an initial trait-intersection count corresponding to traits for an initial time period. In particular, in some embodiments, the act 1030 includes determining an initial trait-intersection count of digital entities corresponding to the first trait and the second trait for an initial time period. In some implementations, the act 1030 further includes generating a trait-intersection-count vector for the initial trait-intersection count by applying network layers of the machine-learning model to the initial trait-intersection count.

As further shown in FIG. 10, the acts 1000 include an act 1040 of generating an estimate trait-intersection count corresponding to the traits for the target time period utilizing a machine-learning model. In particular, in some embodiments, the act 1040 includes, based on the request, generating an estimated trait-intersection count of digital entities corresponding to the first trait and the second trait for the target time period by analyzing the semantic-trait embedding and the initial trait-intersection count for the initial time period utilizing a machine-learning model trained to generate estimated trait-intersection counts.

For instance, in certain implementations, generating the estimated trait-intersection count comprises generating an estimated trait-intersection count of users corresponding to the first trait and a segment for the second trait for the target time period. In one or more embodiments, the machine-learning model trained to generate estimated trait-intersection counts comprises a decision-tree regressor or an artificial neural network.

As a further example, in some embodiments, generating the estimated trait-intersection count for the target time period utilizing the machine-learning model comprises: generating a first modified semantic-embedding vector for the first trait and a second modified semantic-embedding vector for the second trait by applying a trait-embedding matrix of the machine-learning model to the first semantic-embedding vector and the second semantic-embedding vector; and combining the first modified semantic-embedding vector, the second modified semantic-embedding vector, and the trait-intersection-count vector to create a combined-trait-intersection vector.

Relatedly, in one or more embodiments, generating the estimated trait-intersection count for the target time period utilizing the machine-learning model comprises applying additional network layers of the machine-learning model to the combined-trait-intersection vector to determine the estimated trait-intersection count for the target time period.

In addition to the acts 1010-1040, in certain implementations, the acts 1000 further include identifying a time-segment indicator corresponding to the initial time period for the initial trait-intersection count; and generating the estimated trait-intersection count for the target time period in part by analyzing the time-segment indicator utilizing the machine-learning model.

Additionally, in some embodiments, the acts 1000 further include determining, for a plurality of time periods, a rolling average trait-intersection count of digital entities corresponding to the first trait and the second trait or a rolling extremum trait-intersection count of digital entities corresponding to the first trait and the second trait; and generating the estimated trait-intersection count for the target time period in part by analyzing the rolling average trait-intersection count or the rolling extremum trait-intersection count utilizing the machine-learning model.

In one or more embodiments, the machine-learning model is trained based on: semantic-trait-training embeddings for a first training trait and a second training trait; initial trait-intersection-training counts of digital entities corresponding to the first training trait and the second training trait for initial-training-time periods; and ground-truth-trait-intersection counts of digital entities corresponding to the first training trait and the second training trait for a target-training-time period.

As suggested above, in certain implementations, the acts 1000 further include receiving the request for the trait-intersection count for the target time period from a client device; and providing the estimated trait-intersection count for the target time period to the client device for display within a graphical user interface.

As further suggested above, in some embodiments, the acts 1000 further include determining an observed trait-intersection count of users corresponding to the first trait and the second trait for the target time period; determining that a count difference between the estimated trait-intersection count for the target time and the observed trait-intersection count for the target time period satisfies a difference threshold; and identifying a count anomaly for the first trait or the second trait based on the count difference.

In addition (or in the alternative) to the acts describe above, in some embodiments, the acts 900 (or the acts 1000) include a step for utilizing semantic-trait-training embeddings and initial trait-intersection-training counts of users corresponding to training traits to train a trait-intersection-count-machine-learning model. For instance, the algorithms and acts described in relation to FIG. 4A can comprise the corresponding acts for performing a step for utilizing semantic-trait-training embeddings and initial trait-intersection-training counts of users corresponding to training traits to train a trait-intersection-count-machine-learning model.

Additionally, or alternatively, in some embodiments, the acts 900 (or the acts 1000) include a step for generating an estimated trait-intersection count of users corresponding to the first trait and the second trait for the target time period utilizing the trained trait-intersection-count-machine-learning model. For instance, the algorithms and acts described in relation to FIG. 4B can comprise the corresponding acts for performing a step for generating an estimated trait-intersection count of users corresponding to the first trait and the second trait for the target time period utilizing the trained trait-intersection-count-machine-learning model.

Embodiments of the present disclosure may comprise or utilize a special-purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or generators and/or other electronic devices. When information is transferred, or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface generator (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In one or more embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural marketing features and/or methodological acts, it is to be understood that the subject matter defined in the appended claims is not necessarily limited to the described marketing features or acts described above. Rather, the described marketing features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program generators may be located in both local and remote memory storage devices.

Embodiments of the present disclosure can also be implemented in cloud computing environments. In this description, "cloud computing" is defined as a subscription model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing subscription model can be composed of various characteristics such as, for example, on-demand self-service, broad network access, resource pooling, rapid elasticity, measured service, and so forth. A cloud-computing subscription model can also expose various service subscription models, such as, for example, Software as a Service ("SaaS"), a web service, Platform as a Service ("PaaS"), and Infrastructure as a Service ("IaaS"). A cloud-computing subscription model can also be deployed using different deployment subscription models such as private cloud, community cloud, public cloud, hybrid cloud, and so forth. In this description and in the claims, a "cloud-computing environment" is an environment in which cloud computing is employed.

Figure 11:
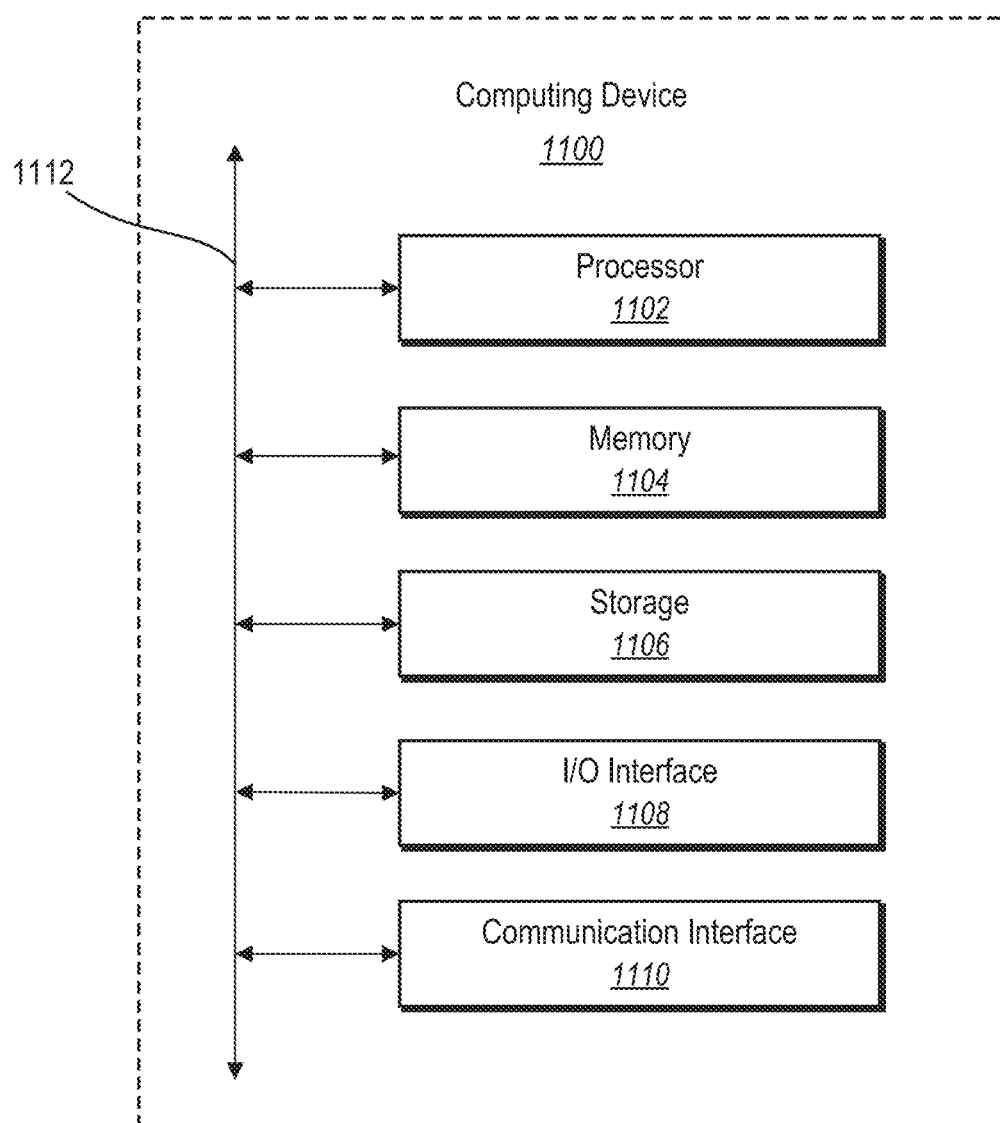
FIG. 11 illustrates a block diagram of an exemplary computing device for implementing one or more embodiments of the present disclosure.

FIG. 11 illustrates a block diagram of exemplary computing device 1100 that may be configured to perform one or more of the processes described above. As shown by FIG. 11, the computing device 1100 can comprise a processor 1102, a memory 1104, a storage device 1106, an I/O interface 1108, and a communication interface 1110, which may be communicatively coupled by way of a communication infrastructure 1112. In certain embodiments, the computing device 1100 can include fewer or more components than those shown in FIG. 11. Components of the computing device 1100 shown in FIG. 11 will now be described in additional detail.

In one or more embodiments, the processor 1102 includes hardware for executing instructions, such as those making up a computer program. As an example, and not by way of limitation, to execute instructions for digitizing real-world objects, the processor 1102 may retrieve (or fetch) the instructions from an internal register, an internal cache, the memory 1104, or the storage device 1106 and decode and execute them. The memory 1104 may be a volatile or non-volatile memory used for storing data, metadata, and programs for execution by the processor(s). The storage device 1106 includes storage, such as a hard disk, flash disk drive, or other digital storage device, for storing data or instructions related to object digitizing processes (e.g., digital scans, digital models).

The I/O interface 1108 allows a user to provide input to, receive output from, and otherwise transfer data to and receive data from computing device 1100. The I/O interface 1108 may include a mouse, a keypad or a keyboard, a touch screen, a camera, an optical scanner, network interface, modem, other known I/O devices or a combination of such I/O interfaces. The I/O interface 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1108 is configured to provide graphical data to a display for presentation to a user. The graphical data may be representative of one or more graphical user interfaces and/or any other graphical content as may serve a particular implementation.

The communication interface 1110 can include hardware, software, or both. In any event, the communication interface 1110 can provide one or more interfaces for communication (such as, for example, packet-based communication) between the computing device 1100 and one or more other computing devices or networks. As an example and not by way of limitation, the communication interface 1110 may include a network interface controller ("NIC") or network adapter for communicating with an Ethernet or other wire-based network or a wireless NIC ("WNIC") or wireless adapter for communicating with a wireless network, such as a WI-FI.

Additionally, the communication interface 1110 may facilitate communications with various types of wired or wireless networks. The communication interface 1110 may also facilitate communications using various communication protocols. The communication infrastructure 1112 may also include hardware, software, or both that couples components of the computing device 1100 to each other. For example, the communication interface 1110 may use one or more networks and/or protocols to enable a plurality of computing devices connected by a particular infrastructure to communicate with each other to perform one or more aspects of the digitizing processes described herein. To illustrate, the image compression process can allow a plurality of devices (e.g., server devices for performing image processing tasks of a large number of images) to exchange information using various communication networks and protocols for exchanging information about a selected workflow and image data for a plurality of images.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

We claim:

1. In a digital medium environment for managing and analyzing digital data repositories, a computer-implemented method for efficiently generating trait-intersection counts from the digital data repositories, comprising:
    maintaining one or more databases comprising a plurality of digital user profiles and a plurality of traits;
    performing a step for utilizing semantic-trait-training embeddings and initial trait-intersection-training counts of users corresponding to training traits to train a trait-intersection-count-machine-learning model;
    identifying a request for a trait-intersection count of users corresponding to a first trait from the plurality of traits and a second trait from the plurality of traits for a target time period; and
    performing a step for generating an estimated trait-intersection count of users corresponding to the first trait and the second trait for the target time period utilizing the trained trait-intersection-count-machine-learning model.

2. The method of claim 1, wherein the trait-intersection-count-machine-learning model comprises a decision-tree regressor or an artificial neural network.

3. The method of claim 1, further comprising:
    receiving the request for the trait-intersection count for the target time period from a client device; and
    providing the estimated trait-intersection count for the target time period to the client device for display within a graphical user interface.

4. The method of claim 1, further comprising:
    determining an observed trait-intersection count of users corresponding to the first trait and the second trait for the target time period;
    determining that a count difference between the estimated trait-intersection count for the target time period and the observed trait-intersection count for the target time period satisfies a difference threshold; and
    identifying a count anomaly for the first trait or the second trait based on the count difference.

5. A non-transitory computer readable medium storing instructions thereon that, when executed by at least one processor, cause a computer system to:
    identify a request for a trait-intersection count of digital entities corresponding to a first trait and a second trait for a target time period;
    identify a semantic-trait embedding of the first trait and the second trait;
    determine an initial trait-intersection count of digital entities corresponding to the first trait and the second trait for an initial time period; and
    based on the request, generate an estimated trait-intersection count of digital entities corresponding to the first trait and the second trait for the target time period by analyzing the semantic-trait embedding and the initial trait-intersection count for the initial time period utilizing a machine-learning model trained to generate estimated trait-intersection counts.

6. The non-transitory computer readable medium of claim 5, further comprising instructions that, when executed by the at least one processor, cause the computer system to:
    generate the semantic-trait embedding by generating a first semantic-embedding vector for the first trait and a second semantic-embedding vector for the second trait utilizing a semantic-word-vector model; and
    generate a trait-intersection-count vector for the initial trait-intersection count by applying network layers of the machine-learning model to the initial trait-intersection count.

7. The non-transitory computer readable medium of claim 6, further comprising instructions that, when executed by the at least one processor, cause the computer system to generate the estimated trait-intersection count for the target time period utilizing the machine-learning model by:
    generating a first modified semantic-embedding vector for the first trait and a second modified semantic-embedding vector for the second trait by applying a trait-embedding matrix of the machine-learning model to the first semantic-embedding vector and the second semantic-embedding vector; and
    combining the first modified semantic-embedding vector, the second modified semantic-embedding vector, and the trait-intersection-count vector to create a combined-trait-intersection vector.

8. The non-transitory computer readable medium of claim 7, further comprising instructions that, when executed by the at least one processor, cause the computer system to generate the estimated trait-intersection count for the target time period utilizing the machine-learning model by applying additional network layers of the machine-learning model to the combined-trait-intersection vector to determine the estimated trait-intersection count for the target time period.

9. The non-transitory computer readable medium of claim 5, further comprising instructions that, when executed by the at least one processor, cause the computer system to:
    identify a time-segment indicator corresponding to the initial time period for the initial trait-intersection count; and
    generate the estimated trait-intersection count for the target time period in part by analyzing the time-segment indicator utilizing the machine-learning model.

10. The non-transitory computer readable medium of claim 5, further comprising instructions that, when executed by the at least one processor, cause the computer system to:
    determine, for a plurality of time periods, a rolling average trait-intersection count of digital entities corresponding to the first trait and the second trait or a rolling extremum trait-intersection count of digital entities corresponding to the first trait and the second trait; and
    generate the estimated trait-intersection count for the target time period in part by analyzing the rolling average trait-intersection count or the rolling extremum trait-intersection count utilizing the machine-learning model.

11. The non-transitory computer readable medium of claim 5, wherein the trait-intersection count of digital entities comprises a trait-intersection count of events, products, users, or transactions.

12. The non-transitory computer readable medium of claim 5, further comprising instructions that, when executed by the at least one processor, cause the computer system to:
identify the request for the trait-intersection count by identifying a segment-trait request for a trait-intersection count of users corresponding to the first trait and a segment for the second trait for the target time period; and
generate the estimated trait-intersection count by generating an estimated trait-intersection count of users corresponding to the first trait and a segment for the second trait for the target time period.

13. The non-transitory computer readable medium of claim 5, wherein the machine-learning model is trained based on:
semantic-trait-training embeddings for a first training trait and a second training trait;
initial trait-intersection-training counts of digital entities corresponding to the first training trait and the second training trait for initial-training-time periods; and
ground-truth-trait-intersection counts of digital entities corresponding to the first training trait and the second training trait for a target-training-time period.

14. A system comprising:
at least one processor;
at least one non-transitory computer readable medium comprising:
digital training data comprising a plurality of training users and a plurality of training traits of the plurality of training users;
a semantic-word-vector model; and
a machine-learning model; and
instructions that, when executed by at least one processor, cause the system to train the machine-learning model by:
applying the semantic-word-vector model to a first training trait from the plurality of training traits and a second training trait from the plurality of training traits to generate a semantic-trait-training embedding;
identifying an initial trait-intersection-training count of users corresponding to the first training trait and the second training trait for an initial-training-time period;
applying the machine-learning model to the semantic-trait-training embedding and the initial trait-intersection-training count to generate an estimated trait-intersection-training count of users corresponding to the first training trait and the second training trait for a target-training-time period; and
modifying parameters of the machine-learning model based on a comparison of the estimated trait-intersection-training count for the target-training-time period with a ground-truth-trait-intersection count of users corresponding to the first training trait and the second training trait for the target-training-time period.

15. The system of claim 14, further comprising instructions that, when executed by at least one processor, cause the system to:
generate the semantic-trait-training embedding by generating a first semantic-embedding-training vector for the first training trait and a second semantic-embedding-training vector for the second training trait; and
generate a trait-intersection-count-training vector for the initial trait-intersection-training count by applying network layers of the machine-learning model to the initial trait-intersection-training count.

16. The system of claim 15, further comprising instructions that, when executed by the at least one processor, cause the system to generate the estimated trait-intersection-training count for the target-training-time period utilizing the machine-learning model by:
generating a first modified semantic-embedding-training vector for the first training trait and a second modified semantic-embedding-training vector for the second training trait by applying a trait-embedding matrix of the machine-learning model to the first semantic-embedding-training vector and the second semantic-embedding-training vector; and
combining the first modified semantic-embedding-training vector, the second modified semantic-embedding-training vector, and the trait-intersection-count-training vector to create a combined-trait-intersection-training vector.

17. The system of claim 16, further comprising instructions that, when executed by the at least one processor, cause the system to generate the estimated trait-intersection-training count for the target-training-time period utilizing the machine-learning model by applying additional network layers of the machine-learning model to the combined-trait-intersection-training vector to determine the estimated trait-intersection-training count for the target-training-time period.

18. The system of claim 14, further comprising instructions that, when executed by the at least one processor, cause the system to:
identify a time-segment-training indicator corresponding to the initial-training-time period for the initial trait-intersection-training count; and
generate the estimated trait-intersection-training count for the target-training-time period by analyzing the time-segment-training indicator utilizing the machine-learning model.

19. The system of claim 14, further comprising instructions that, when executed by the at least one processor, cause the system to:
determine, for a plurality of training-time periods, a rolling average trait-intersection-training count of users corresponding to the first training trait and the second training trait or a rolling extremum trait-intersection-training count of users corresponding to the first training trait and the second training trait; and
generate the estimated trait-intersection-training count for the target-training-time period in part by analyzing the rolling average trait-intersection-training count or the rolling extremum trait-intersection-training count utilizing the machine-learning model.

20. The system of claim 14, wherein the machine-learning model comprises a decision-tree regressor or an artificial neural network.

* * * * *